United States Patent [19]
Dubnowski et al.

[11] 4,164,025
[45] Aug. 7, 1979

[54] SPELLED WORD INPUT DIRECTORY INFORMATION RETRIEVAL SYSTEM WITH INPUT WORD ERROR CORRECTIVE SEARCHING

[75] Inventors: John J. Dubnowski, Bethlehem Township, Hunterdon County; Aaron E. Rosenberg, Berkeley Heights, both of N.J.

[73] Assignee: Bell Telephone Laboratories, Incorporated, Murray Hill, N.J.

[21] Appl. No.: 860,101

[22] Filed: Dec. 13, 1977

[51] Int. Cl.² ............................................. G06F 7/22
[52] U.S. Cl. .................................................. 364/900
[58] Field of Search ... 364/900 MS File, 200 MS File; 340/146.3 WD, 146.3 ED; 179/1 S D

[56] References Cited

U.S. PATENT DOCUMENTS

| Re. 26,919 | 6/1970 | Hagelbarger et al. | 364/900 |
|---|---|---|---|
| 3,188,609 | 6/1965 | Harmon et al. | 340/146.3 WD |
| 3,259,883 | 7/1966 | Rabinow et al. | 340/146.3 WD |
| 3,492,653 | 1/1970 | Fosdick et al. | 340/146.3 WD |
| 3,533,069 | 10/1970 | Garry | 340/146.3 WD |
| 3,641,495 | 2/1972 | Kiji | 340/146.3 ED |
| 3,651,459 | 3/1972 | Hahn | 340/146.3 WD |
| 3,715,730 | 2/1973 | Smith et al. | 364/200 |
| 3,928,724 | 12/1975 | Byram et al. | 179/1 SD |
| 3,969,700 | 7/1976 | Bollinger et al. | 340/146.3 WD |
| 4,010,445 | 3/1977 | Hoshino | 340/146.3 WD |
| 4,020,473 | 4/1977 | Fujimura | 364/200 |
| 4,058,795 | 11/1977 | Balm | 340/146.3 WD |
| 4,071,888 | 1/1978 | Owens | 364/200 |
| 4,092,493 | 5/1978 | Rabiner et al. | 179/1 SD |
| 4,092,729 | 5/1978 | Rosenbaum et al. | 364/900 |
| 4,118,788 | 10/1978 | Roberts | 364/900 |

*Primary Examiner*—Melvin B. Chapnick
*Attorney, Agent, or Firm*—J. S. Cubert

[57] ABSTRACT

An arrangement for retrieving information from a directory responsive to a sequence of spoken character signals in which a set of probable characters for each character signal is stored in a position ordered array. A candidate word is formed from the most probable characters of the array and the directory is repeatedly searched for words therein which match a candidate word. After each unsuccessful search, the candidate word is modified by selectively substituting array characters for mismatched position characters on the basis of the closest mismatched word found in the preceding search. If there are no more array characters for substitution after an unsuccessful search, a new candidate word is formed by placing an ignore character in the first mismatched position of the best candidate word of all preceding searches. The position of the ignore mismatch character is shifted left each time no further array characters are available for substitution. Responsive to detection of a matching word, a spoken message is generated from the information associated therewith.

31 Claims, 15 Drawing Figures

RANGE SELECTOR

DIRECTORY ACCESS LOGIC

FIG. 6   DIRECTORY STORE

FIG. 7 COMPARISON LOGIC

MATCHED NAME LOGIC AND STORE

CANDIDATE MODIFIER

SEQUENCE CONTROL

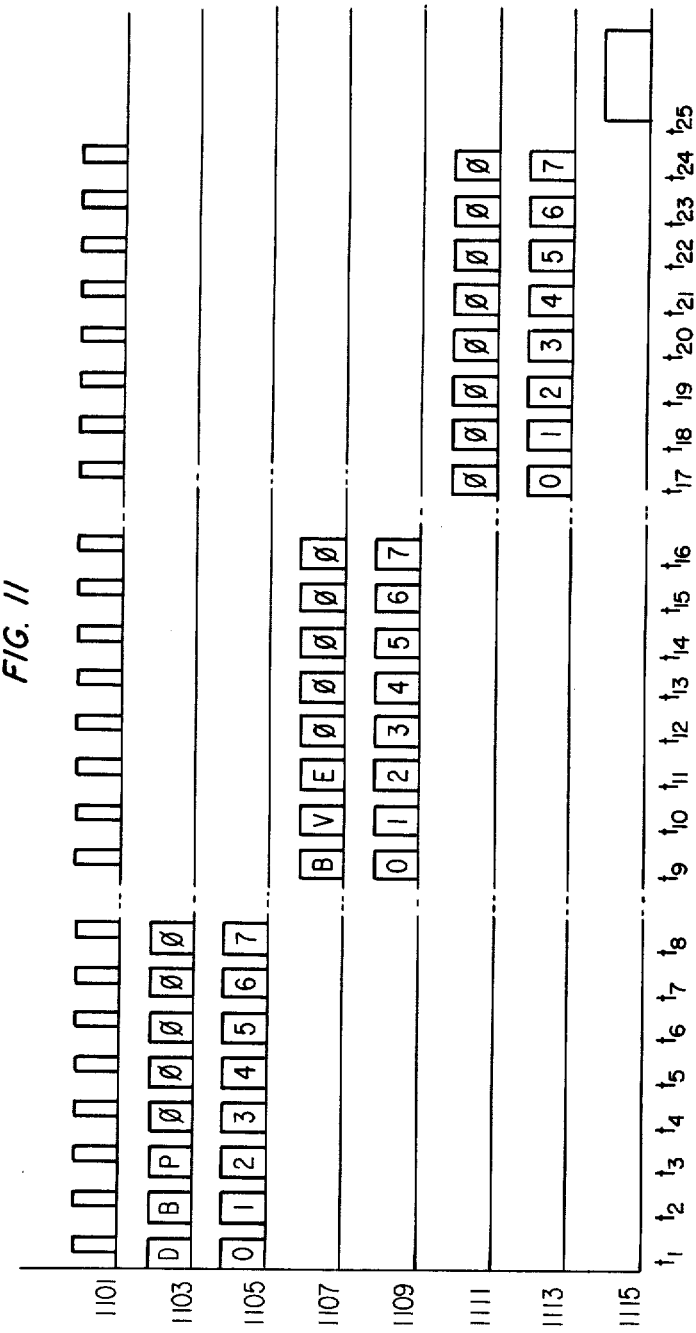

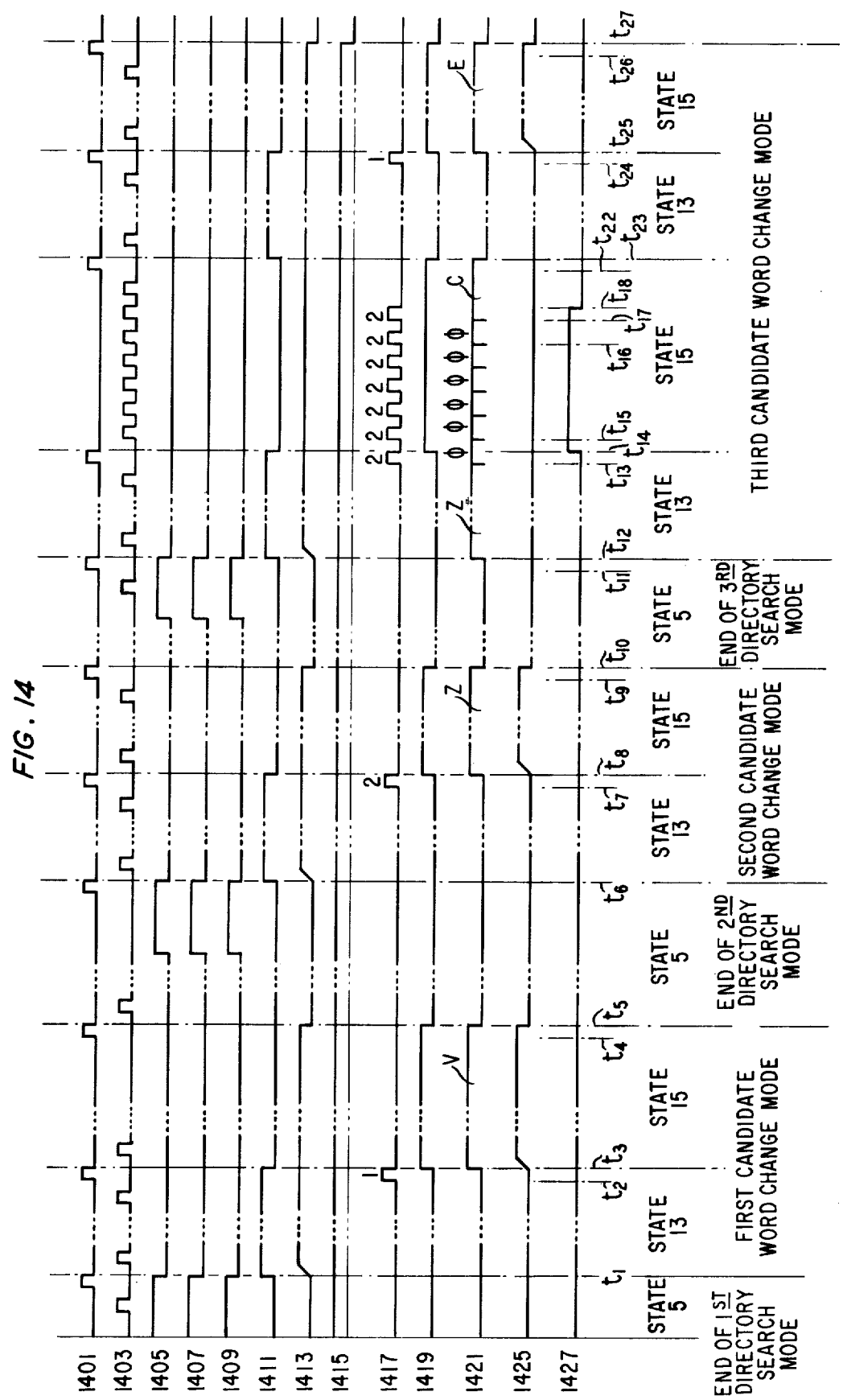

SPELLED WORD INPUT DIRECTORY INFORMATION RETRIEVAL SYSTEM WITH INPUT WORD ERROR CORRECTIVE SEARCHING

BACKGROUND OF THE INVENTION

This invention relates to word recognition arrangements and, more particularly, to directory assistance retrieval systems incorporating spelled word recognition.

In communication, data processing, and control systems, it is often advantageous to use written or spoken words as direct input for inquiries, data or other information. Such word input arrangements may be utilized to record information, to control machine tools or other apparatus, or to access information from processing equipment. A directory assistance system, for example, may conveniently utilize spoken word inquiries to automatically access stored subscriber information. In one such system disclosed in U.S. Pat. No. 3,928,724 issued Dec. 23, 1975, the spoken spelled last name of a subscriber is used as input to retrieve subscriber information. The spoken characters of the spelled subscriber name are recognized to provide digital data to a computer wherein digital signals representing subscriber names are stored. The input digital data is matched to the stored subscriber digital signals and a message including the desired subscriber information is returned to the inquirer.

As is well known in the art, the variability of a speech signal from speaker to speaker, or even for a particular speaker, limits the accuracy of speech recognition. As a result, the usefulness of a spoken word retrieval system is highly dependent on the accuracy of character and word recognition. Similarly, the usefulness of a written or printed word retrieval system is dependent on the accuracy of character recognition. One type of recognition arrangement, disclosed in U.S. Pat. No. 3,259,883, issued July 5, 1966, uses a dictionary look-up technique to improve recognition accuracy. In the event one or more characters of an input word character sequence are unrecognized, but other characters are accurately recognized, trial characters are substituted for the unrecognized characters. The resulting word is compared to the stored words of the dictionary to derive matching dictionary words. Alternatively, the unrecognized character positions are ignored, and the dictionary words which match the recognized characters are obtained. This dictionary look-up arrangement improves recognition accuracy but requires a time consuming matching process and generally yields more than one choice for the inaccurately recognized word.

Another word recognition system disclosed in U.S. Pat. No. 4,010,445, issued Mar. 1, 1977, discloses the storage of reference words in block units arranged so that characters placed in one or more given positions of an input character string may be used as a retrieval key. Comparison of the input character string, which may include unrecognized character positions, with the keyed blocks allows rapid detection of a stored dictionary word similar to the input character string. While the keyed block arrangement reduces the time required for retrieval, it requires that most characters of the input character string be accurately recognized.

As is well known in the art, input signal characteristics may be similar to precribed characteristics of several stored characters whereby the recognition of the input signal is in doubt. Consequently, the resulting recognized character string includes several possibilities rather than a single recognized character for each input signal. Responsive to the array of possible recognized words, the dictionary look-up techniques previously described provide a large number of equally possible words from which one word must be chosen. In the system disclosed in U.S. Pat. No. 3,533,069, issued Oct. 6, 1970, a best guessed word is selected from all possible trail words formed from the plurality of possible trial characters derived from input signals. Each trial character is assigned an associated priority, i.e., first, second or third choice. Each possible trial word is compared with reference words stored in a context limited dictionary. A best guess dictionary word from the plurality of matching dictionary words is chosen on the basis of the product of the trial word character priorities and the context dependent probability of occurrence of the matching dictionary words. In this manner, the accuracy of character recognition is improved for context limited dictionaries.

In general, dictionary type stores contain large numbers of words which are unrelated and the probability of occurrence of any particular word is the same as any other word. The use of trial word character priorities is not applicable to such context independent dictionary stores since, in the absence of probability factors for dictionary words, only the highest priority trial word is utilized. Directory assistance systems typically include a large number of subscriber names that are not context related and are equally probable. The aforementioned systems therefore, do not provide a basis for detecting a word or subscriber name corresponding to an input character string that is inaccurately recognized.

BRIEF SUMMARY OF THE INVENTION

The invention is directed to an arrangement for recognizing words corresponding to a sequence of spelled input character signals in which a directory stores a plurality of words for recognition. A set of probable characters for each spelled character signal is stored in position ordered array. A candidate word is generated from the character sets of the arry. The directory is searched at least once to determine directory words which correspond to the sequence of spelled character signals. In each search, a sequence of directory words is selected responsive to the candidate word. The characters of each selected directory word are compared to the characters of the candidate word in left to right order to detect matching directory words. Responsive to the nonmatching words, the rightmost first mismatched position of all the nonmatching directory words is detected. Jointly responsive to the absence of at least one matching directory word in the sequence and the detected rightmost first mismatched position of the sequence, a modified candidate word is generated for the succeeding directory search. When at least one matching directory word is detected in a directory search, the sequence of spelled characters is identified.

According to one aspect of the invention, the candidate word of a directory search is modified by substituting another character from the set in the detected rightmost first mismatched position of the array for the character in said detected mismatched position of the candidate word. If there is no probable character available in the detected mismatched position, the detected mismatched position is shifted left to the next position in which a probable character is available and that probable character is substituted in the corresponding position of the candidate word.

According to yet another aspect of the invention, the rightmost first mismatched position of all preceding directory searches is detected and stored together with the candidate word of the directory search in which it is found. When there are no available characters in the leftmost position of the array for substitution in the candidate word, the modified candidate word is formed from the stored candidate word wherein an ignore character is placed in the detected rightmost first mismatched position of all preceding directory searches. Said directory searches and candidate word modifications are continued until there are no available characters in the leftmost position of the array for substitution. the inserted ignore character is then shifted to the adjacent left position for the succeeding directory search. Responsive to the inserted ignore character in the leftmost position and no available characters in the next to leftmost position for substitution, a signal is generated representative of no identification for the sequence of spelled character signals in the directory.

According to yet another aspect of the invention, each directory word addresses associated information also stored in the directory. Responsive to the detection of at least one matching directory word is a search, the associated information for each stored matching directory word is retrieved from the directory store.

According to yet another aspect of the invention, the probable characters in each array position are stored in most probable to least probable order and the first generated candidate word comprises the most probable character of each position of the array.

According to yet another aspect of the invention, each directory search comparison is left to right comparison. In the absence of a probable character in the array position corresponding to the detected rightmost first mismatched position, the candidate word is modified by inserting the most probable character of that position of the array in the rightmost first mismatched position and replacing the character in the adjacent left position with the next most probable character from the corresponding adjacent left position of the array.

According to yet another aspect of the invention, the best candidate word corresponding to the detected rightmost first mismatched position of all directory searches yielding no matching directory words is detected and stored. Upon detection of the absence of a probable character in the leftmost character position of the array for use in the candidate word, the candidate word is replaced by the best candidate word modified by placing an ignore mismatch character in the first mismatched position thereof. Upon determination of the absence of a probable character in the leftmost character position of the array for candidate word formation and the presence of an ignore mismatch character in the candidate word of the preceding directory search, the candidate word of the preceding directory search is modified by replacing the ignore mismatch character with the most probable character in that position of the array and placing an ignore character in the adjacent left position.

According to yet another aspect of the invention, the directory searches are terminated when the ignore character is in the leftmost position and the last probable character of the next to leftmost position has been substituted in the candidate word.

In an embodiment illustrative of the invention, a string of spoken characters which form a spelled word are applied to an acoustic recognizer. Responsive to each spoken character, the acoustic recognizer generates a set of probable recognized characters which are placed in a left to right position ordered character array, the character set of the first character signal being placed in the leftmost position. Each character position of the array stores the probable recognized position characters in most probable to least probable order. A candidate word is generated by selecting the most probable character of each position of the array.

The directory is repeatedly searched to detect words therein corresponding to the input character string. In each directory search, the characters of each directory word are compared to the characters of the candidate word in left to right order. Each matching directory word is detected and stored. Responsive to the nonmatching directory words, the rightmost first occurring mismatched position of all nonmatching directory words is stored. Upon detection of no matching directory words in a search, the candidate word is modified by replacing the character in the stored mismatched position with the next most probable character in the same position of the array. Responsive to the detection of at least one matching word in a directory search, the information associated with detected matching directory words is retrieved.

In the event that no probable characters are available in the stored mismatched position for substitution in the candidate word after an unsuccessful directory search, the most probable character from the stored mismatched position of the array is returned to the mismatched position of the candidate word. The stored mismatched position is shifted left to the next positon in which there is an available probable character for substitution and the available character in said next position is inserted into the corresponding position of the candidate word.

During the directory searches, the best candidate word in the current and all preceding searches is determined by detecting the candidate word having the rightmost first occurring mismatched position for the current and all preceding directory searches. Upon termination of the directory search in which the rightmost first occurring mismatched position of the sequence is the leftmost position and in which no further characters are available in the leftmost position of the array for substitution, the candidate word is replaced by the best candidate word modified by placing an ignore character in the rightmost first occurring mismatched position of the current and all preceding directory searches.

The ignore character is replaced by the most probable character in the mismatched position and is shifted to the adjacent left position upon detection of the absence of an available character for candidate word modification in the leftmost position of the array. When the ignore character is in the leftmost position of the candidate word and there is no available character in the next to leftmost position for candidate word modification, the directory searches are terminated.

BRIEF DESCRIPTION OF THE DRAWING

FIGS. 11-14 show waveforms and charts illustrating the operation of the circuits of FIGS. 1-10B.

GENERAL DESCRIPTION

Figure 1:
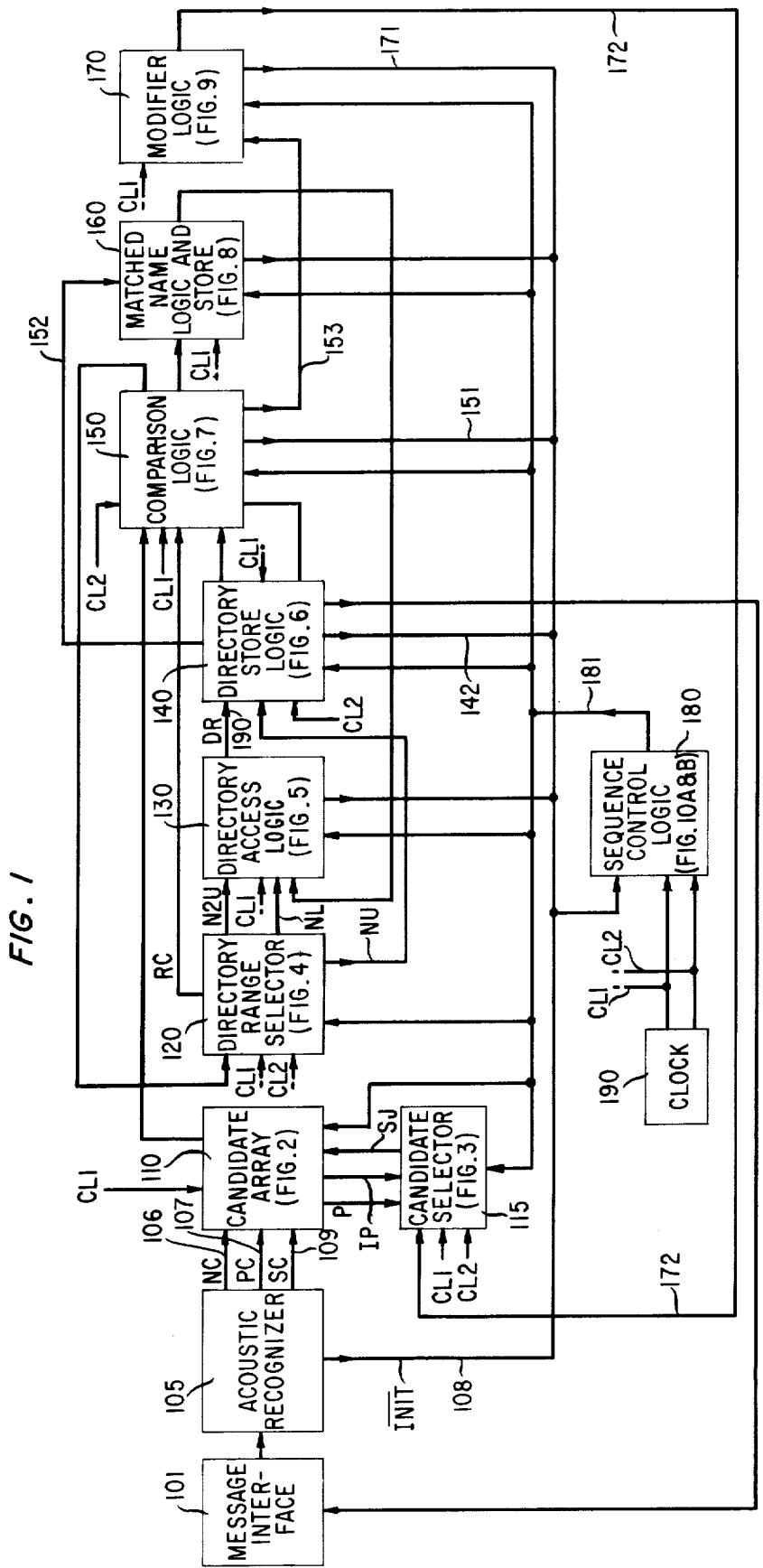
FIG. 1 depicts a general block diagram of a spoken character directory assistance circuit illustrative of the invention.

FIG. 1 shows a general block diagram of a spoken word directory assistance system illustrative of the invention. The system of FIG. 1 is used to provide information associated with subscribers listed in a directory responsive to a spoken character sequence spelling a subscriber's last name and his initials. Alternatively, the directory assistance system may comprise a programmed general purpose computer adapted to perform the functions described with respect to FIG. 1. The spoken input character signals from message interface 101 are sequentially applied to acoustic recognizer 105 in FIG. 1. Message interfere 101 may comprise a plurality of telephone station sets and a telephone switching network, a station set arrangement for use by a telephone operator or an attendant, or a microphone and amplifier combination and a loudspeaker arrangement for responses from the directory assistance system. Acoustic recognizer 105 may comprise a circuit adapted to provide a set of digitally coded probable characters for each input signal by comparing the features of the input character signal with previously stored reference features obtained from the set of spoken alphabetic characters.

Each set of probable characters obtained from acoustic recognizer 105 is stored in position ordered candidate array 110. Assume, for purposes of illustration, that the input character signal string corresponds to the spelled name, Beck, G. A. Table 1 lists the sets of probable characters in position order obtained from acoustic recognition of the illustrative spelled name.

TABLE 1

| INTENDED NAME | B | E | C | K | G | A |
|---|---|---|---|---|---|---|
| Probable | D | B | C | J | φ | A |
| Character | B | V | Z | φ | φ | φ |
| Sets | P | E | φ | φ | φ | φ |
|  | φ | φ | φ | φ | φ | φ |

Each character set in Table 1 is arranged in most probable to least probable order. The most probable character in the zero, or leftmost position, is D. The intermediate probable character in this position is B, and the least probable character in this position is P. There is no recognized character in the fifth position, and only one recognized character appears in each of the fourth and sixth positions. An unrecognized character is represented by φ and is ignored in the character matching operations of the circuit of FIG. 1. It is readily apparent from Table 1 that, (a) no combination of characters corresponds to the intended spelled name of the input character string, (b) the most probable candidate name is DBCJφA which contains four misrecognized or unrecognized characters, and (c) the directory comprises an alphabetically ordered list of subscriber names, each of which is equally likely.

After the most probable candidate word is generated in array 110, for the most probable characters of the positions of Table 1, the signal $\overline{INIT}$ is applied to sequence control logic 180 via line 108 which is operative to terminate the acoustic recognition mode and to initiate the first directory search mode. In the first directory search mode, the most probable candidate word is applied from array 110 to directory range selector 120 which is operative to determine the lower and upper bounds of a sequence of directory words corresponding to selected characters of the candidate word supplied thereto. The selected sequence includes all directory words which could possibly match the candidate word. An extension of the directory range does not add possible matching directory words and only increases the time required for the search.

Responsive to the lower bound coded signal from directory range selector 120, directory access logic 130 addresses the directory words of the determined sequence, which directory words are stored in store 140. Each addressed directory word from store 140 is supplied to comparison logic 150 and is therein compared in left to right character order with the candidate word from array 110. When a directory word matches the candidate word except for the ignore mismatch positions, the directory word address is applied from directory access logic 130 to matched name logic and store 160 via line 152 and is stored therein. If a directory word does not match the candidate word, the first occurring mismatched character position is detected and a coded signal corresponding to the mismatched position is sent from comparison logic 150 to candidate modifier logic 170 via line 153.

In candidate modifier logic 170, the rightmost first occurring mismatch position (MI) of all mismatched directory words of the sequence is detected and stored. The MI position represents the closest mismatched word detected in the sequence, i.e., the word with the greatest sequence of matched characters from left to right. Modifier logic 170 is also operative to determine and store the rightmost first occurring mismatched position of all preceding directory searches as the coded signal MMI. The word in which the MMI position is found is the best mismatched word of the current and preceding directory searches and the candidate word corresponding to this best mismatched word is stored in array 110. At the end of the directory word sequence determined by the upper bound signal NU from directory range selector 120 is directory store logic 140, the directory search mode is terminated by sequence control logic 180.

In the event at least one matching directory word is detected during the directory search mode, sequence control logic 180 causes the directory retrieval mode to be started. During the directory retrieval mode, the matching directory word addresses from matched name logic and store 160 are supplied to directory store 140 via directory access logic 130 and the information associated with each matching directory word is retrieved from store 140. A spoken message corresponding to the retrieved information is then generated and supplied to message interface 101. If no matching directory word is detected in the directory search mode, the candidate word change mode is initiated by sequence control logic 180 in which the rightmost first occurring mismatched position (MI) of the sequence is supplied from candidate modifier logic 170 to candidate selector 115 responsive to the (MI) mismatched position signal on line 172.

Candidate selector 115 is operative to modify the candidate word at the output of array 110. The modified candidate word is produced by replacing the character in the mismatched position MI with the next most probable character from the corresponding position of the array. It is unnecessary to modify candidate word positions to the right of the MI position since such modifications cannot result in detection of matching directory words or provide a better mismatched word. If all recognized characters in the mismatched position (MI) of the array have been exhausted in preceding directory searches, the most probable character in the mismatched position is returned to the candidate word and the next most probable character in the nearest left position of the array with an available character is substituted in the candidate word. After the modification of the candidate word, the candidate word change mode is terminated by sequence control logic 180 and a new directory search mode is started on the basis of the modified candidate word.

The directory search and candidate word change modes are repeated until either (1) matching directory words are found, or (2) there are no more available characters in the first position of candidate array 110 for substitution. In the latter event, the mismatched position MMI of the best mismatched word in the preceding directory searches is supplied to candidate selector 115.

At this time, it is concluded that none of the probable characters in at least one position of the array could match the corresponding character of any directory word. It is therefore necessary to ignore mismatches in one candidate word position in succeeding directory searches in order to detect a directory word which corresponds to the input character signal string. The MMI position is the best position to ignore in subsequent directory searches since ignoring positions to the right of the MMI position could not result in detection of matching directory words. The candidate word corresponding to the best mismatched word of all preceding directory searches is obtained from array 110 responsive to the operation of candidate selector 115 and an ignore mismatch character $\phi$ is placed in the mismatched position MMI of the best candidate word. The directory search and candidate change modes are resumed using the ignore character in the MMI position.

Upon exhaustion of all available characters in the zero (leftmost) position of the array for candidate word modification, it is apparent that the MMI position is not the position in which none of the probable characters could match the corresponding directory word position. A position to the left of the MMI position, however, could be in error. The inserted ignore mismatch character is therefore replaced by the most probable character in the MMI position of the array and an ignore character is placed in the adjacent left position of the candidate word. The ignore mismatch character is shifted left one position each time all available characters in the zero position are exhausted. If the ignore mismatch character is used in the zero position of the candidate word during a subsequent directory search, and all available characters in candidate array 110 have been used to modify a candidate word, the directory search and candidate word change mode sequence is halted by sequence control logic 180. A message is then generated in directory store logic 140 to inform the inquirer via message interface 101 that there is no subscriber listed in the directory corresponding to the input character string.

Table 2 illustrates the operation of the circuit of FIG. 1 responsive to the spoken spelled character input BECK, GA shown in Table 1.

TABLE 2

| 1 | 2 | 3 | 4 | 5 | 6 | 7 |
|---|---|---|---|---|---|---|
| Directory Search | Candidate Word | Closest Mismatched Word | First Mismatched Position (MI) | Best Mismatched Word | Best First Mismatched Position | Modified Candidate Word |
| 1 | DBCJ$\phi$A | DAVISRH | 1 | DAVISRH | 1 | DVCJ$\phi$A |
| 2 | DVCJ$\phi$A | DVORAKDL | 2 | DVORAKDL | 2 | DVZJ$\phi$A |
| 3 | DVZJ$\phi$A | DVORAKDL | 2 | DVORAKDL | 2 | DECJ$\phi$A |
| 4 | DECJ$\phi$A | DECNA | 3 | DECNA | 3 | DEZJ$\phi$A |
| 5 | DEZJ$\phi$A | DESMETRE | 2 | DECNA | 3 | BBCJ$\phi$A |
| 6 | BBCJ$\phi$A | BARTLETTJE | 1 | DECNA | 3 | BVCJ$\phi$A |
| 7 | BVCJ$\phi$A | BURKHARDEG | 1 | DECNA | 3 | BECJ$\phi$A |
| 8 | PECJ$\phi$A | BECCONEJP | 3 | DECNA | 3 | BEZJ$\phi$A |
| 9 | PEZJ$\phi$A | BEZAKST | 3 | DECNA | 3 | PBCJ$\phi$A |
| 10 | PBCJ$\phi$A | PARKERK$\phi$ | 1 | DECNA | 3 | PVCJ$\phi$A |
| 11 | PVCJ$\phi$A | PULLEYBM | 1 | DECNA | 3 | PECJ$\phi$A |
| 12 | PECJ$\phi$A | PECCAID | 3 | DECNA | 3 | PEZJ$\phi$A |
| 13 | PEZJ$\phi$A | PEZDIRTZ | 3 | DECNA | 3 | DEC$\phi\phi$A |
| 14 | DEC$\phi\phi$A | DECNA | 3 | | | DEZ$\phi\phi$A |
| 15 | DEZ$\phi\phi$A | DESMETRE | 2 | | | BBC$\phi\phi$A |
| 16 | BBC$\phi\phi$A | BARTLETTJE | 1 | | | BVC$\phi\phi$A |
| 17 | BVC$\phi\phi$A | BURKHARDEG | 1 | | | BEC$\phi\phi$A |
| 18 | BFC$\phi\phi$A | BECKGA | match | | | |

In Table 2 are listed the search mode candidate word, the closest mismatched word of the search, the rightmost first occurring mismatched position (MI) of the search, the best mismatched word of the current and preceding searches, the rightmost first occurring mismatched position (MMI) of the current and preceding searches, and the modified candidate word generated in the candidate word change mode following the search.

During this first directory search, the most probable candidate word DBCJφA from Table 1 is used. D is in the zero position, B is in the first position and C, J, φ, A are in the second to fifth positions. The closest mismatched word found is DAVISRH. The first occurring mismatched position MI is the first position corresponding to the mismatch of character B of the candidate word and character A of the directory word. Since only one search has been completed, DAVISRH is the best mismatched word and MMI is the first position. Because the first position is mismatched, the next most probable character in the first position, i.e., V, replaces the B in the most probable candidate word. In this way, the modified candidate word DVCJφA is formed for the second directory search as shown in column 2.

In the third directory search, the candidate word is DVZJφA and the closest mismatched word is DVORAKDL. The second position is the MI mismatched position. Since Z is the last available character of the second position of the array, the most probable second position character C replaces Z in that position, and the next available character of the first position of the array, i.e., E, is substituted for the V in the first position of the candidate word. The modified candidate word becomes DECJφA as shown in column 7 of directory search No. 3.

At the end of the ninth directory search, the last available characters have been used in the first, second and third positions of candidate word BEZJφA. The first occurring mismatched position MI of the closest mismatched directory word BEZAKST of the ninth directory search is the third position. J, which is the only probable character in the third position, remains in the modified candidate word but the second position character is changed. Since the Z in second position of the candidate word is the last probable character, it is replaced by the most probable character of the second position in the array, i.e., C. The last available character (E) in the first position of the candidate word is then replaced by the most probable character of that position, i.e., B; and the zero position character B of the candidate word is replaced by the next available character in the zero position of the array, i.e., P. The modified candidate word for the next directory search is then PBCJφA.

In the candidate change mode following the thirteenth directory search, the third position of the candidate word (J) is mismatched and there are no available characters for substitution in the zero, first, second and third positions of array 110 as shown in Table 1. Since the last available character in the zero position has already been used, the candidate word corresponding to the stored best mismatched word of all preceding directory searches is retrieved from array 110. This candidate word, DECJφA from directory search No. 4, is now modified by placing an ignore mismatch character φ in the mismatched third position. The candidate word for the fourteenth search is then DECφφA.

The candidate word in the eighteenth directory search (BECφφA) matches the directory word BECKGA except for the ignore mismatch characters in the third and fourth positions since the φ positions of the candidate word are ignored in character comparison operations. Responsive to the detection of at least one matching directory word in a directory search mode, control logic 180 initiates the directory retrieval mode after the eighteenth directory search. In this directory retrieval mode, the information in directory store 140 associated with the directory word BECKGA is retrieved; a spoken message is generated from the retrieved information in store 140; and the synthesized message from directory store 140 is transmitted to the inquirer via message interface 101.

DETAILED DESCRIPTION

Referring to the general block diagram of FIG. 1, acoustic recognizer 105 includes a stored set of previously obtained feature signals for each alphabetic character. The string of input character signals from message source 101 represents the spoken spelled name of a subscriber whose name is asserted to be in directory store 140. Each input character signal of the spoken spelled name is transformed into a predetermined set of feature signals representing the input character signal. The feature signals for the input character are compared to the stored previously obtained feature signals for each alphabetic character. Responsive to the feature signal comparison, a set of probable character codes NC are generated. A zero (φ) code represents an unrecognized character which is ignored in character comparisons; the one to twenty-six codes represent the characters A to Z, respectively; and a 27 code represents a stop signal corresponding to the end of input characters.

For each probable character, a signal PC representative of the degree of similarity between the probable character feature signal and the input character feature signal is also generated. With respect to the example illustrated in Tables 1 and 2, the probable characters for the zero or leftmost position input character signal are D, B and P in most to least probable order. The PC, or post number signal corresponding to the D is zero since D is the most probable character. The PC signal corresponding to the B is one, and the PC signal corresponding to the third most probable character P is two. The NC and PC coded signals for the zero character position are sequentially applied to candidate array 110. A shift signal SC is supplied with each pair of NC and PC signals. In similar manner NC, PC and SC signals are generated for each succeeding input character signal.

One arrangement for acoustic recognizer 105 is described in the article, "Minimum Predictive Residual Principle Applied to Speech Recognition," by F. Itakura appearing in the IEEE Transactions on Acoustics Speech and Signal Processing, Vol. 23, pp. 67–72, February 1975. In the Itakura arrangement, reference linear prediction derived signals are stored for prescribed words or characters spoken by a designated individual. When an unknown character is later uttered by the designated individual, the linear prediction derived signal obtained therefrom is compared to the reference character derived signal by means of a distant metric. The closest corresponding (least distance metric) reference character is identified as the unknown input character. As used in the circuit of FIG. 1, the acoustic recognizer of Itakura provides a set of probable characters NC ordered in accordance with distance metrics for each input character signal, a set of correspondence signals PC for each probable character, and a set of signals SC upon the occurrence of the probable characters.

Figure 2:
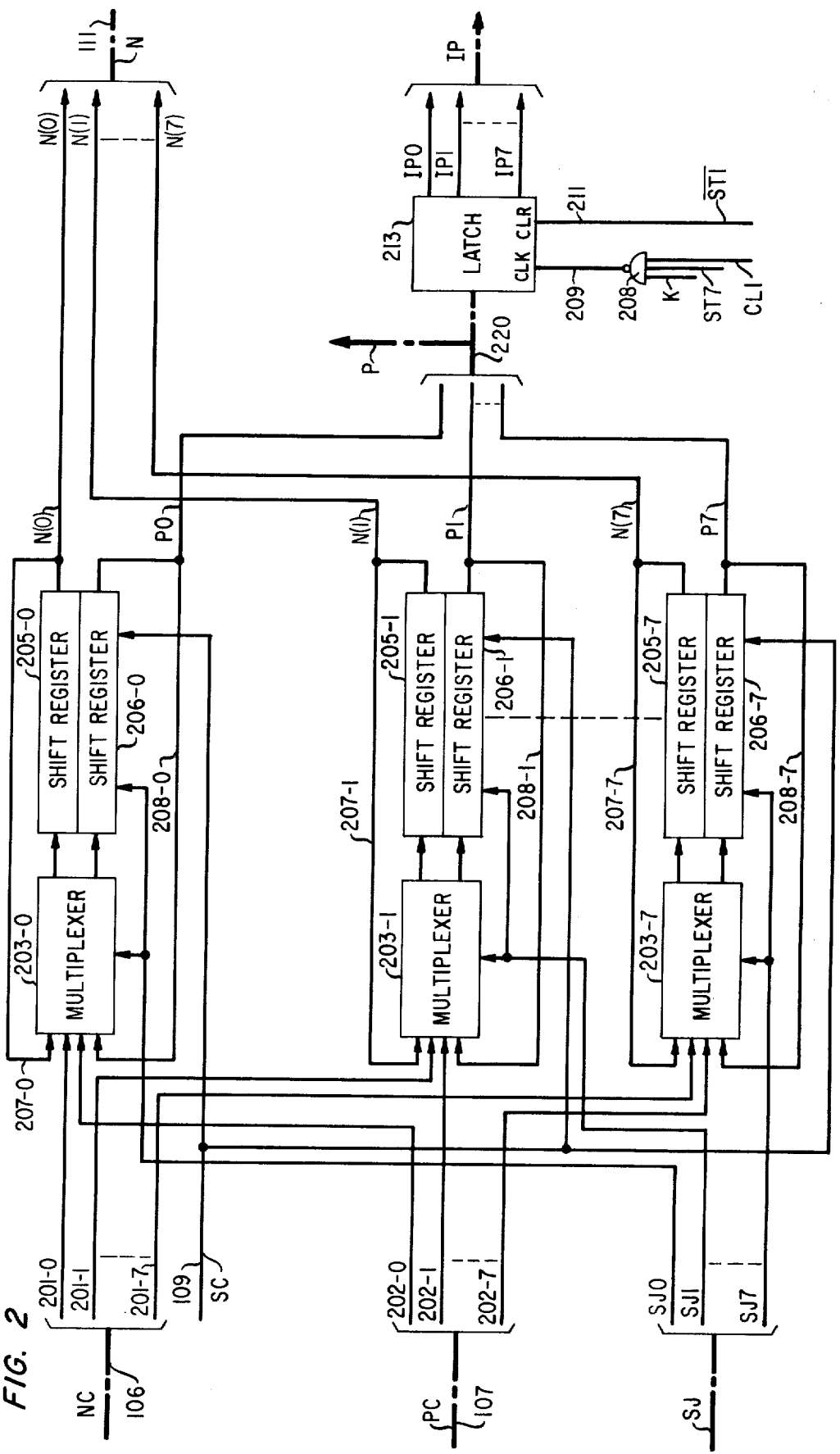
FIG. 2 depicts a detailed block diagram of the candidate array of FIG. 1.

In the circuit of FIG. 1, the NC and PC signals for the set of probable characters of each character position are sequentially applied to candidate array 110 shown in detail in FIG. 2. Referring to FIG. 2, recirculating shift register 205-0 is used to store the zero, or leftmost, character position probable character set and associated shift register 206-0 is operative to store the order or post numbers corresponding to the probable characters in the zero position set. Similarly, shift register 205-1 stores the first position probable character set while shift register 206-1 stores the associated probable character post numbers. In like manner, shift register 205-7 stores the seventh or rightmost position probable character set and shift register 206-7 stores the post numbers associated with the probable characters in shift register 205-7. The probable character sets for the third to sixth positions are stored in similar shift register arrangements not shown in FIG. 2. Latch 213 comprises a group of eight latching stores which selectively store the post numbers from the outputs of shift registers 206-0 to 206-7 whereby the candidate word corresponding to the best matched word is identified.

At the beginning of the acoustic recognition mode for the input character string corresponding to the spoken spelled character string BECK, GA, the leftmost position probable character set D, B, P is generated in acoustic recognizer 105. This probable character set, NC(0) is then sequentially applied to zero position shift register 205-0 via line 201-0 of cable 106 and multiplexer 203-0. As illustrated in waveform 1101 of FIG. 11, a series of eight SC shift pulses are generated in acoustic recognizer 105 for each character set so that eight characters are inserted into shift register 205-0. Waveform 1103 illustrates the sequence of probable character codes applied to shift register 205-0 and waveform 1105 illustrates the sequence of post number codes which are applied into register 206-0 to indicate the order or degree of similarity of the probable characters in register 205-0.

After the recognized characters are inserted, $\phi$ (ignore mismatch) characters are inserted. At time $t_1$ in FIG. 11, the D character signal is applied to the input of shift register 205-0 and the 0 post signal is applied to the input of register 206-0. Responsive to the SC shift signal at $t_1$ (waveform 1101) applied to line 109, the D character signal is inserted into the last or seventh position of register 205-0, and the 0 signal is inserted into the corresponding position of register 206-0. At time $t_2$, the B character signal is inserted into the last position of register 205-0 while the D character signal is shifted into the sixth position of this register. Concurrently, the one post number signal of waveform 1105 is inserted into the seventh position of register 206-0 while the 0 post number signal is shifted into the sixth position thereof.

Responsive to the third SC shift pulse occurring at time $t_3$, the P character signal of waveform 1103 and the 2 signal of waveform 1105 are inserted into the seventh positions of shift registers 205-0 and 206-0, respectively, while the previously inserted D and B character signals are shifted to the fifth and sixth positions, respectively, in register 205-0. Concurrently, the 0 and 1 post number signals are shifted to the fifth and sixth positions of register 206-0, respectively. Subsequent to the insertion of the P character signal, a sequence of five $\phi$ coded signals are placed in register 205-0 while the sequence of 3 to 7 post signals are placed in the corresponding positions of register 206-0. Upon termination of the insertion of the leftmost probable character set in zero position register 205-0, the D, B and P signals are in the zero, first and second positions in shift register 205-0, and the post numbers are in sequential order in shift register 206-0.

After generation of the next to leftmost probable character set in acoustic recognizer 105, the probable character signals, B, V, E are applied to shift register 205-1 via line 201-0 of cable 106 and multiplexer 203-1 while the corresponding post numbers are applied to register 206-1 via line 202-1 of cable 107 and multiplexer 203-1. At $t_9$, the most probable character signal B is applied to the input of register 205-1 and is shifted into the seventh position thereof by the then occurring SC shift signal on line 109. The zero post number signal is shifted into the seventh position of register 206-1 at this time. At time $t_{10}$, the V signal is shifted into the seventh position of register 205-1 while the 1 post signal is shifted into the seventh position of register 206-1. Subsequent to the insertion of the E character signal at time $t_{11}$, five $\phi$ characters are shifted into register 205-1 while the 3 to 7 post signals are shifted into register 206-1. After time $t_{16}$, registers 205-1 and 206-1 are filled. The zero or output position of register 205-1 contains the most probable character B. The next or first position of this register contains the next most probable character V, and the second position contains the least most probable character E. Register 206-1 identifies the order of the probable characters in register 205-1. The probable character sets corresponding to the E, C, K and G character signals are then inserted into similar shift registers not shown in FIG. 2 responsive to the generation of these character sets in recognizer 105. Upon the generation of the rightmost character set in recognizer 105 for the rightmost character signal which character set consists of all $\phi$ characters, shift register 205-7 is filled with $\phi$ character codes in all positions and the post number signals are placed in register 206-7 as illustrated in waveforms 1101 and 1111, and 1113 between times $t_{17}$ through $t_{25}$.

After registers 205-7 and 206-7 have been filled, the shift registers of array 110 contain the position ordered sets of probable characters for use in the generation of candidate words. FIG. 12 shows the contents of array 110 at the end of the acoustic recognition mode. Character position zero contains the sequence D, B, P followed by five zero characters. Character position 1 contains the sequence B, V, E followed by five zero characters. Position 2 contains the sequence C, Z followed by six $\phi$ characters. Position 3 contains the sole recognized character J followed by seven $\phi$ characters. Position 4 corresponding to an unrecognized character contains eight $\phi$ characters. Positive five corresponding to the single recognized character A contains the A character signal in the first position and zero characters in the following seven positions. Since the input sequence is a six character sequence, a special code "27" is generated by the acoustic recognizer in the sixth position to indicate the termination of the input character sequence. Position 7 contains all $\phi$ characters, since there is no character signal in the input character signal string for this position.

A control signal $\overline{\text{INIT}}$ shown in waveform 1115 of FIG. 11 is generated in acoustic recognizer 105 after the eighth character set is inserted into register 205-7. The $\overline{\text{INIT}}$ signal is applied to sequence control logic 180 via line 108 at time $t_{25}$ so that the acoustic recognition mode may be terminated. Control logic 180 is shown in detail in FIGS. 10A and 10B. Referring to FIG. 10B, the control logic therein comprises a set of 18 D-type flip-flops well known in the art. Each of the flip-flops in flip-flop set 1000 is reset by the INIT signal from recognizer 105. Flip-flop 1001A, for example, is reset by signal $\overline{\text{INIT}}$ so that its zero output is high and its one output is low. Similarly, the zero outputs of the other flip-flops of set 1000 are placed in their high states while the one outputs of said other flip-flops are placed in their low states. The zero outputs of all the D-type flip-flops of set 1000 are applied to NAND gate 1001 in FIG. 10A which in turn provides a low level signal to inserter 1002. The output of inverter 1002 becomes high thereby enabling the ST0 and D1 signals therefrom. The ST signals from flip-flop set 1000 in FIG. 10B are selectively applied to the other circuit blocks of FIG. 1 via line 181. These ST state signals are utilized to control the operation of the circuit of FIG. 1 in conjunction with the CL1 and CL2 clock signals from clock 190.

Figure 3:
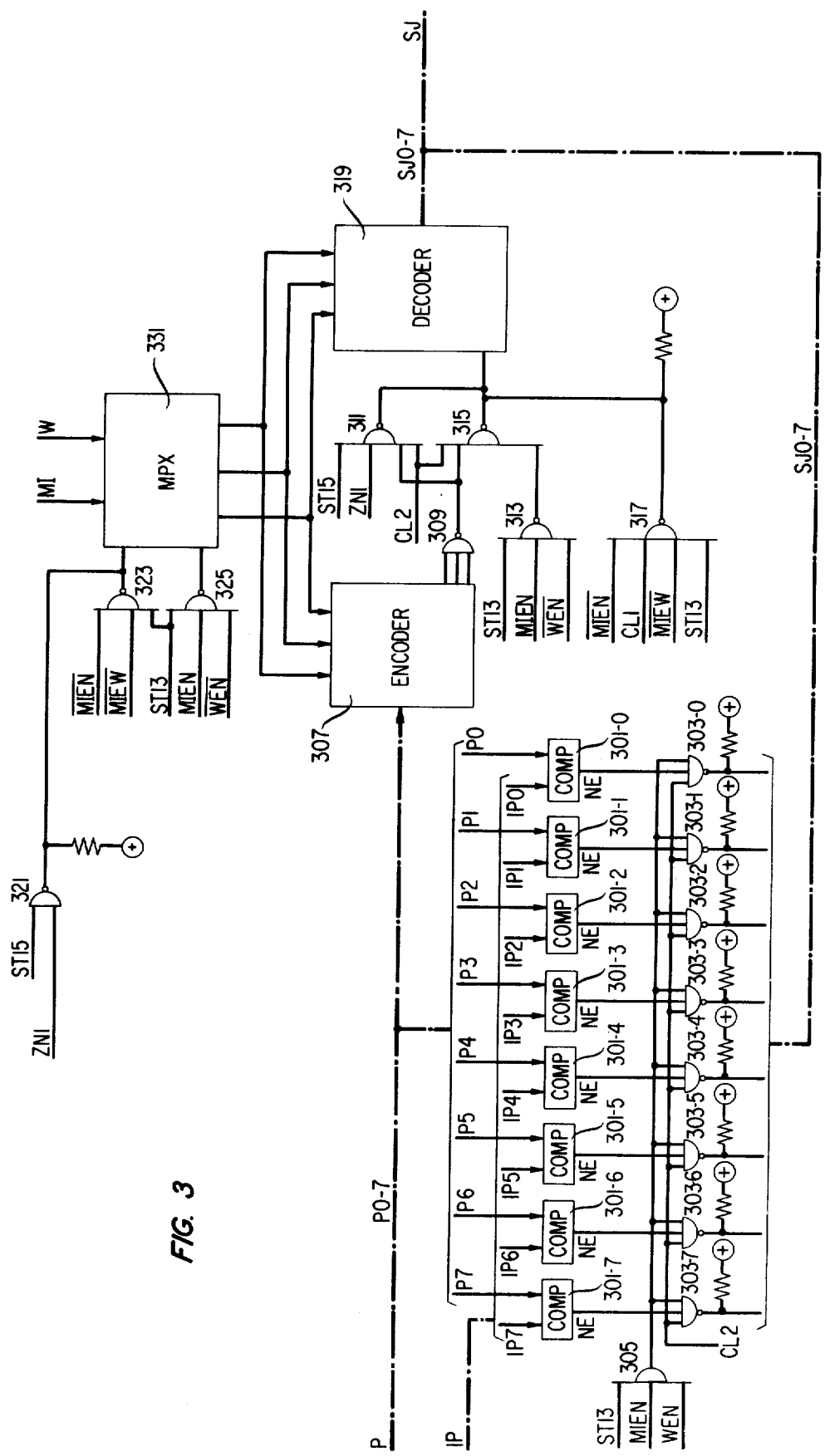
FIG. 3 depicts a detailed block diagram of the candidate selector of FIG. 1.
Figure 13:
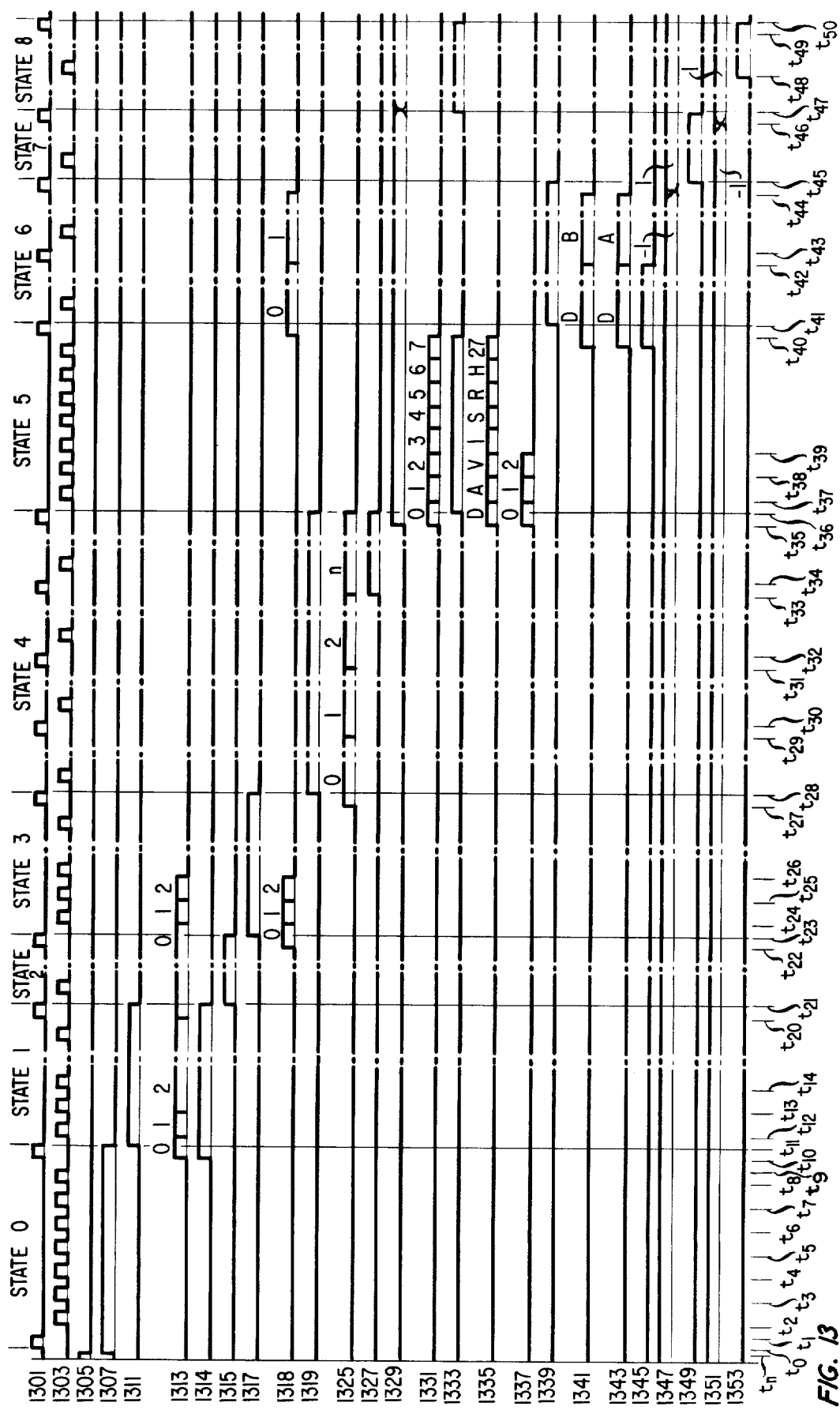

Clock 190 comprises an arrangement of oscillators and timing circuits well known in the art which are operative to produce clock signals CL1 and CL2 illustrated in waveforms 1301 and 1303 of FIG. 13. The CL1 clock pulses shown in waveform 1301 are generated at a first predetermined repetition rate as shown in FIG. 3. The first CL1 clock pulse of waveform 1301 occurs between times $t_0$ and $t_1$. The second CL1 clock pulse occurs between times $t_{10}$ and $t_{11}$. In the interval between $t_1$ and $t_{10}$, clock 190 generates the regularly spaced sequence of seven CL2 clock pulses shown in waveform 1303. The CL2 clock pulses define the character positions of array 110 for each state time interval between two successive CL1 clock pulses.

Assume for purposes of illustration that the $\overline{INIT}$ signal shown in waveform 1305 of FIG. 13 becomes high prior to time $t_N$.

Figure 9:
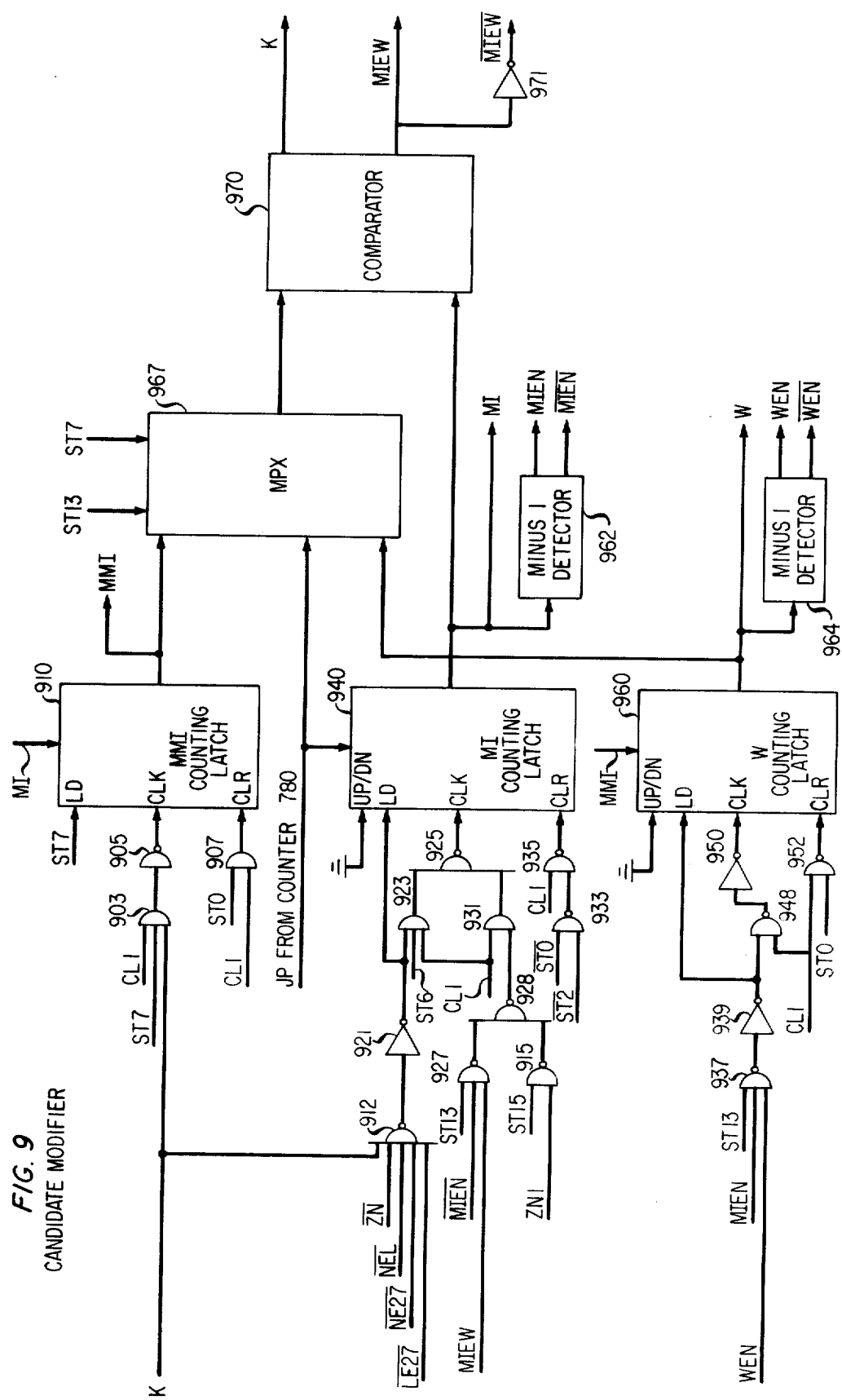
FIG. 9 depicts the candidate modifier logic circuit of FIG. 1.
Figure 10A:
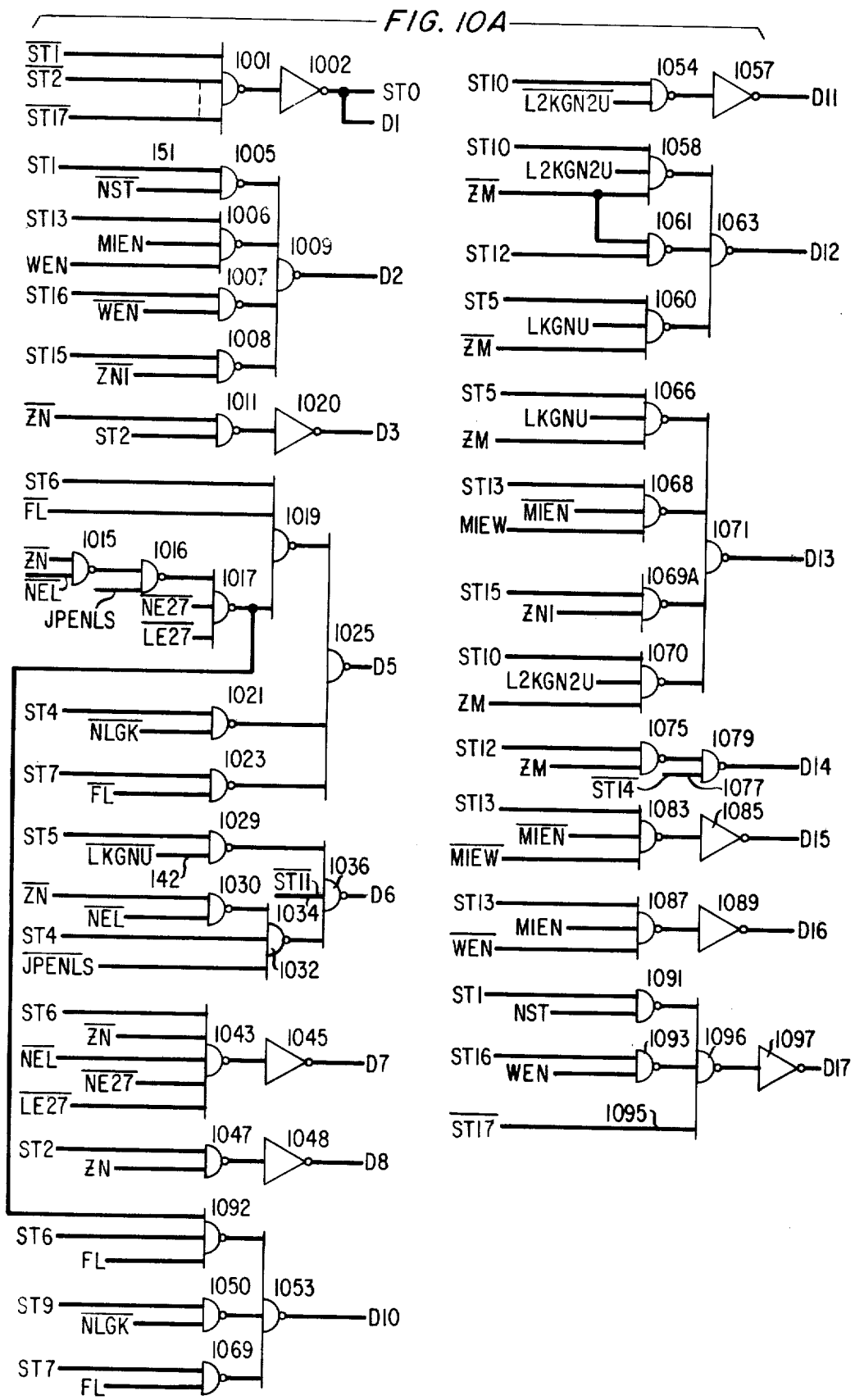
FIGS. 10A and 10B depict the sequence control logic of FIG. 1.
Figure 10B:
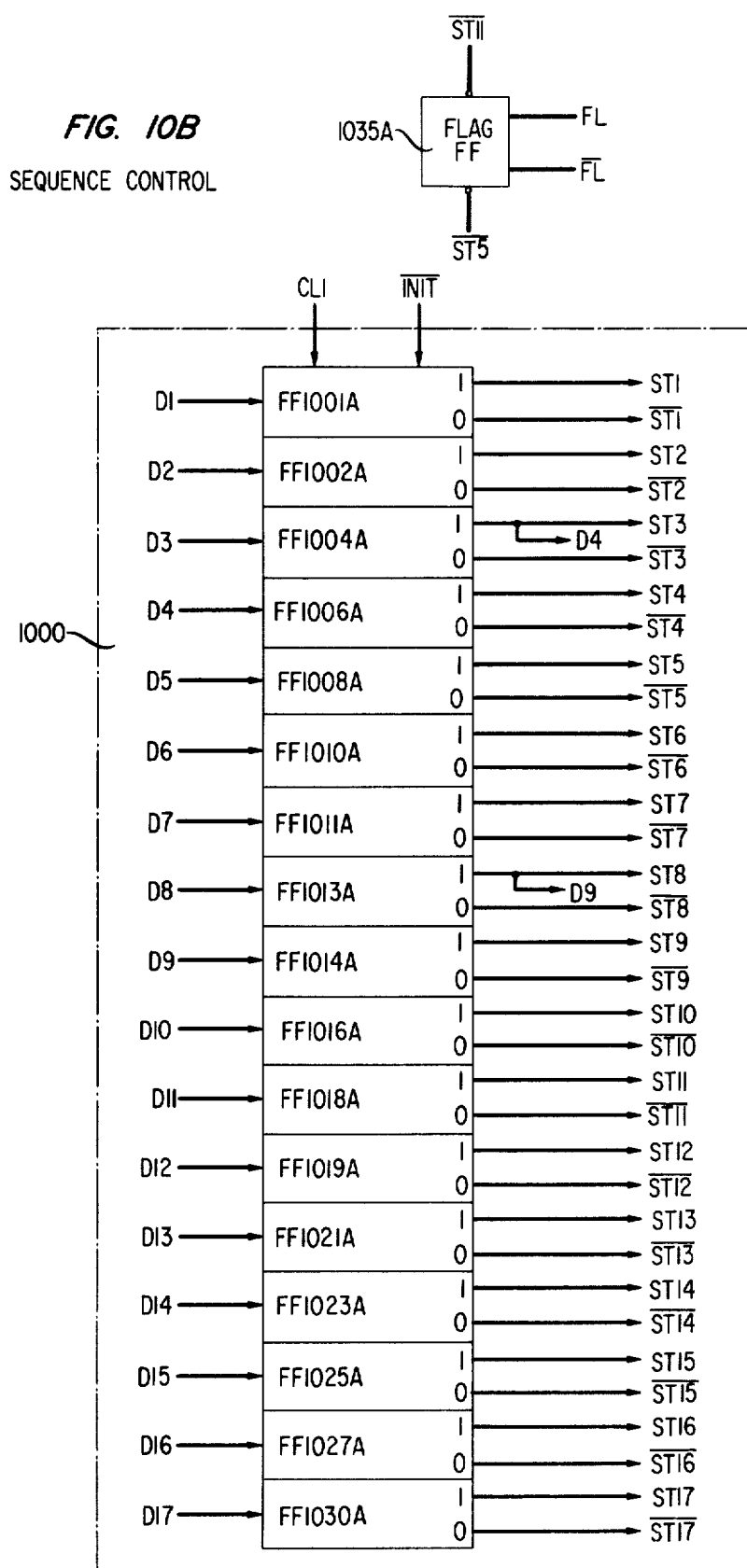

At time $t_N$ in FIG. 13, each flip-flop of the flip-flop set 1000 in FIG. 10B is reset whereby the ST0 and the D1 signal from the output from inverter 1002 of FIG. 10A become high as illustrated in waveform 1307. The ST0 signal initiates the first directory search mode. The ST0 signal is utilized to initially reset storage devices in comparison logic 150, matched name logic and store 160, and candidate modified logic 170 which are shown in detail in FIGS. 7, 8 and 9, respectively.

Figure 8:
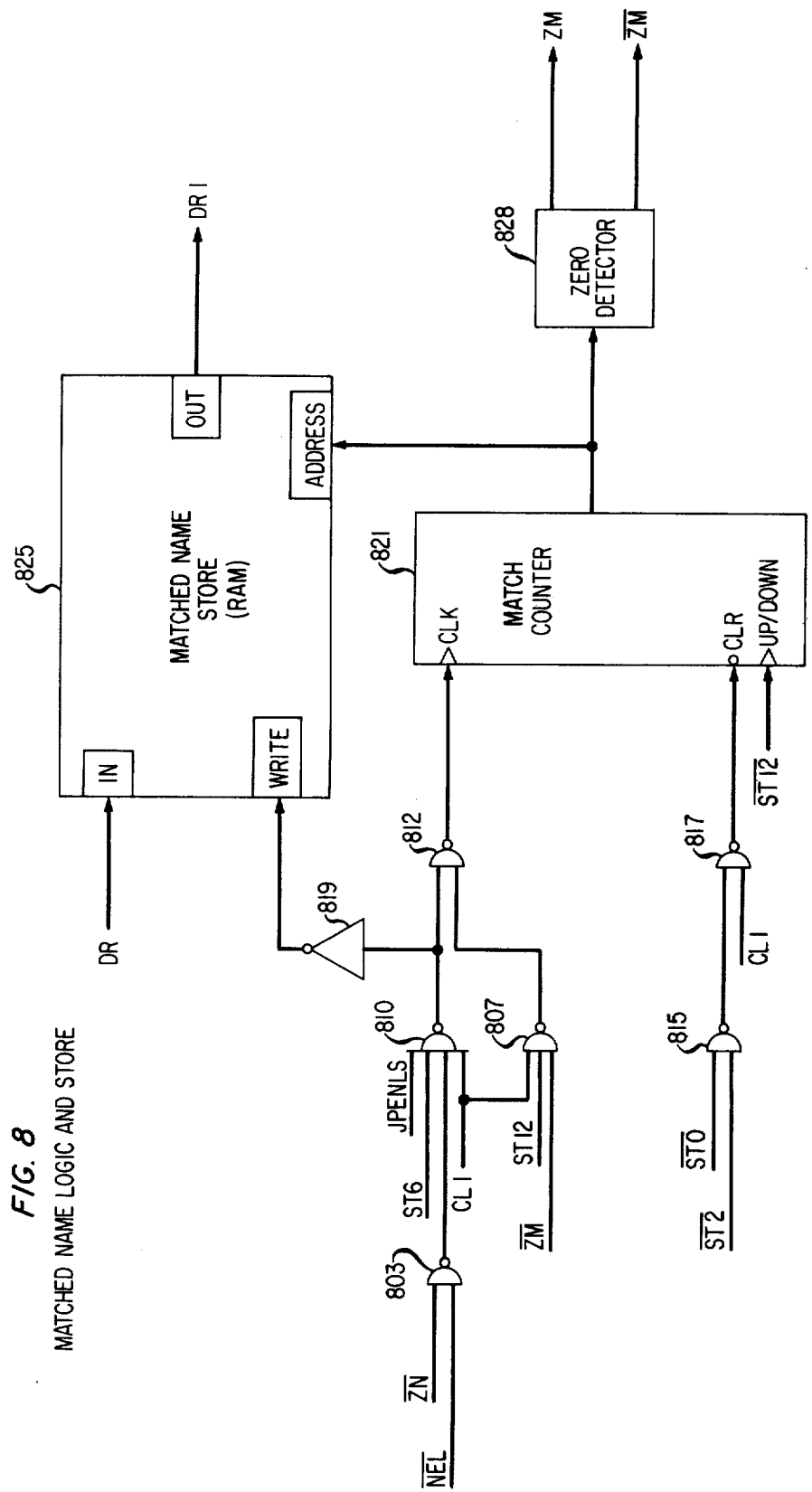
FIG. 8 depicts a detailed block diagram of the matched name logic and store circuit of FIG. 1.

Referring to FIG. 8, the low $\overline{ST0}$ signal supplied to one input of NAND gate 815 provides a high output therefrom. Upon the appearance of the high CL1 clock signal at time $t_{10}$ of the state 0 time interval, NAND gate 817 is enabled and provides a low output to the clear input of match counter 821 whereby the match counter is reset to its zero state. As is well known in the art, a NAND gate provides a high output when at least one input thereto is low and provides a low output only when all its inputs are high. In FIG. 9, the high ST0 and CL1 signals enable gate 907 at $t_{10}$ whereby counting latch 910 is reset to its zero state. Similarly, the high ST0 state and CL1 signals applied to NAND gate 952 at time $t_{10}$ are operative to reset W counter latch 960 to its minus state. The low $\overline{ST0}$ signal applied to gate 933 during the state 0 time interval provides a high input to NAND gate 935 whereby MI counting latch 940 is cleared to minus 1 at $t_{10}$ by the CL1 clock pulse input to NAND gate 935. At time $t_{11}$ the high D1 signal from inverter 1002 in FIG. 10A coincident with the negative transition of clock pulse CL1 in the state 0 time interval causes flip-flop 1001A in FIG. 10B to be set to its one state wherein the ST1 output is high and the $\overline{ST1}$ output is low.

The ST1 signal is shown in waveform 1311 of FIG. 13. Responsive to the ST1 signal doing high at time $t_{11}$, the ST0 signal goes low, whereby the latch resetting operation of the state zero time interval is terminated. The low $\overline{ST1}$ signal is applied via line 211 to the clear input of latch 213 in array 110 shown in detail in FIG. 2. The IP0 through IP7 output codes of latch 213 are thereby reset low preparatory to the later storage of the candidate word post numbers corresponding to the best candidate word in latch 213.

Figure 7:
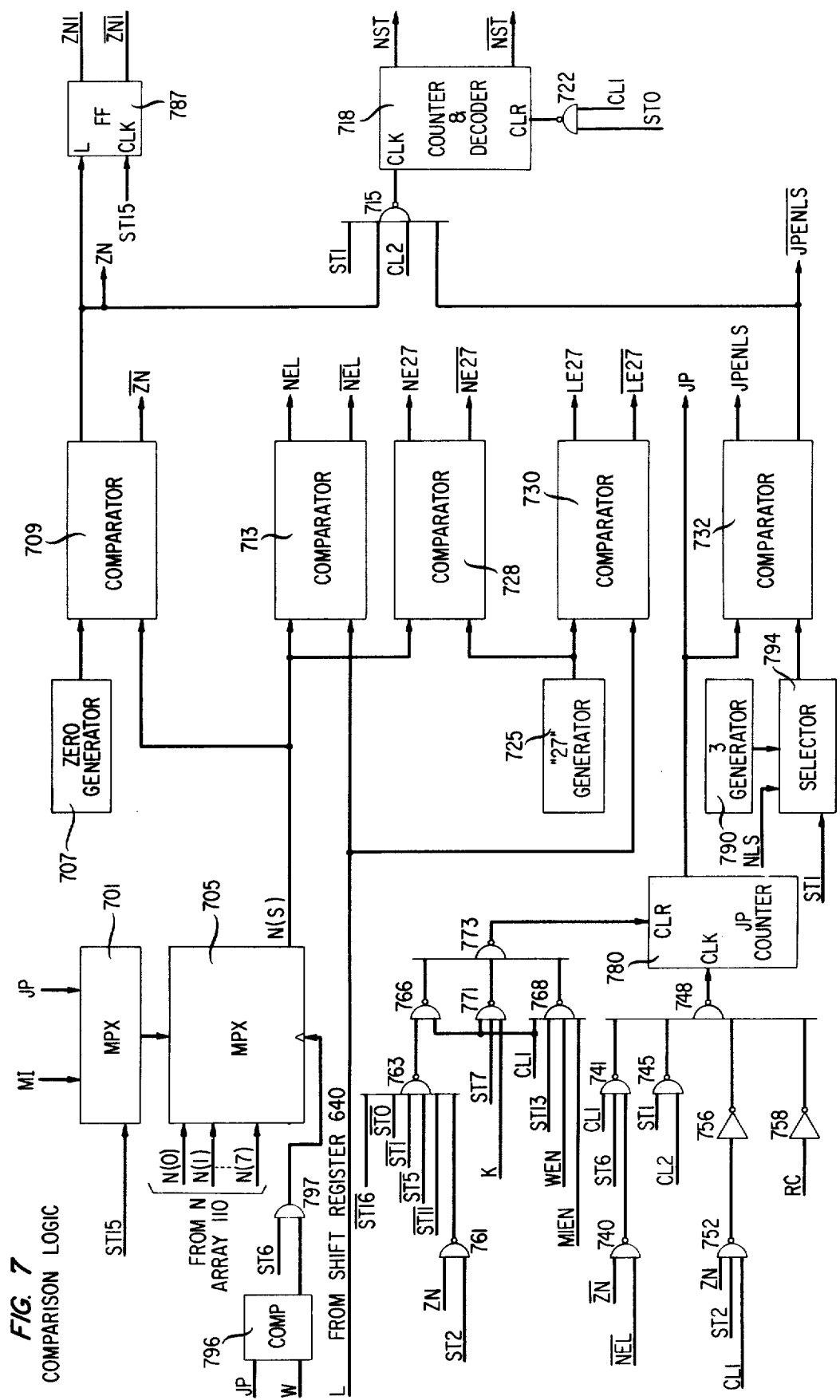
FIG. 7 depicts a detailed block diagram of the diagram of the comparison logic of FIG. 1.

In the ST1 time interval, the most probable candidate word zero, first and second position characters are available at the outputs of shift registers 205-0, 205-1 and 205-2, respectively as coded signals N0, N1 and N2. These characters (D, B, C) are inspected to determine whether they are all $\phi$s. In the event these characters are $\phi$s, a directory word sequence for comparison with the candidate word cannot be selected. The inspection is accomplished in comparison logic 150 shown in FIG. 7. Referring to FIG. 7, JP counter 780 which counts character positions in array 110 was previously cleared to its zero state by the low $\overline{ST0}$ signal on gate 763 and the high CL1 pulse on gate 766 at the end of the state 0 time interval. The JP=0 output from counter 780 (waveform 1313) is applied to the control input of multiplexer 705 via multiplexer 701 in the absence of an ST15 control signal.

The zero through seven position outputs of candidate array 110 from shift registers 205-0 through 205-7 are applied in parallel to the N(0) through N(7) inputs of multiplexer 705, respectively. Responsive to the JP=0 signal, the zero position character (D) from shift register 205-0 is selected and supplied via multiplexer 705 to one input of comparator 709. A $\phi$ code is supplied to the other input of comparator 709 from zero code generator 707, and the D character from array 110 is compared to the zero code from generator 707. Since they are not equal, the ZN output of comparator 709 is low. Consequently, no input pulse is applied to the CLK input of NST counter 718 via gate 715 during the first CL2 clock pulse of the state 1 time interval.

During the state 1 interval, signal ST1 is high (waveform 1311) and the CL2 clock pulses applied to gate 745 in FIG. 7 pass through gates 745 and 748 to increment JP counter 780. Responsive to the first CL2 clock pulse (waveform 1303 at time $t_{12}$), JP counter 780 is placed in its 1 state. The JP=1 signal beginning at time $t_{12}$ causes the B character output of shift register 205-1 to be applied to the input of comparator 709. No high ZN signal is obtained from comparator 709 as a result of comparing the B character signal from shift register 205-1 with the zero signal from generator 707. The next CL2 clock pulse applied to gate 745 at $t_{13}$ places JP counter 780 in its second state (waveform 1313); and the JP=2 pulse causes multiplexer 705 to connect the C character output of shift register 205-2 to comparator 709. No high ZN signal is obtained from comparator 709 as a result of comparing the second position character C of array 110 to the zero code from generator 707. During the state 1 time interval, a three signal from code generator 790 is applied to comparator 732 responsive to the high ST1 control signal applied to the control input of selector 794. When counter 780 reaches its third state, the output of comparator 732 inhibits gate 715 for the remainder of the state 1 time interval. Counter 718 is thereby prevented from counting any $\phi$ character in the third to seventh character positions of array 110.

Since NST counter 718 does not change state responsive to the operation of counter 709 in the state 1 time interval, a high $\overline{NST}$ signal and a low NST signal are produced. If the zero, first and second position characters from array 110 were all $\phi$, NST counter would be in its third state so that a high signal NST would be enabled. The high $\overline{NST}$ signal from NST counter 718

(waveform 1314) is applied to one input of gate 1005 (FIG. 10A) in sequence control logic 180 via line 151. The coincidence of the high ST1 signal and the high $\overline{NST}$ signal causes gate 1009 to produce a high D2 signal. This D2 signal is supplied to the input of D-type flip-flop 1002A in FIG. 10B. On the occurrence of the negative transition of the state one interval CL1 pulse (time $t_{21}$ in waveform 1301) flip-flop 1002A is set to its 1 state and flip-flop 1001A is reset to its 0 state. In this manner, the ST1 signal is waveform 1311 goes low at time $t_{21}$, while the ST2 signal in waveform 1315 goes high.

Figure 4:
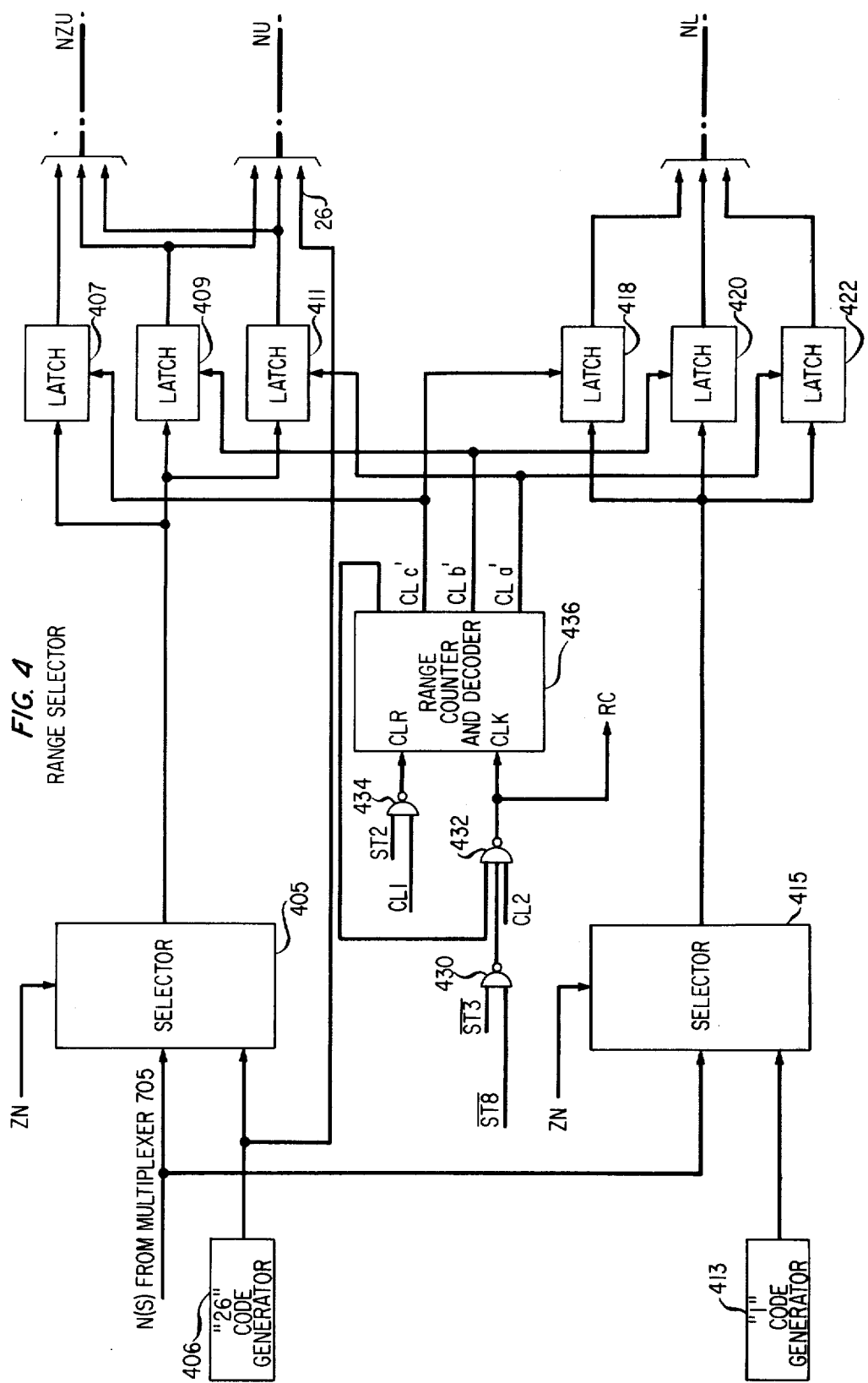
FIG. 4 depicts a detailed block diagram of the directory range selector of FIG. 1.

During the state 2 time interval between times $t_{21}$ and $t_{23}$, the zero position character (D) from array 110 is inspected to determine if it is a $\phi$ character. In the event this position character is $\phi$, an indirect directory range selection is made as described later. Range counter and decoder 436 in directory range selector 120 of FIG. 4 is reset by the state 2 time interval CL1 clock pulse on gate 434 at time $t_{23}$. MI counting latch 940 in candidate modifier logic 170 of FIG. 9 is reset to its minus 1 state by the state 2 interval CL1 clock pulse on gate 935 at time $t_{23}$; and match counter 821 in match name logic and store 160 of FIG. 8 is reset to its zero state by the state 2 interval CL1 clock pulse on gate 817 at time $t_{23}$. The output of JP counter 780 is JP=0 in the ST2 time interval as shown in waveform 1313 since the counter was cleared responsive to the low $\overline{ST1}$ signal input to gate 763 and the high CL1 clock pulse input to gate 766 at time $t_{20}$ of the state 1 time interval.

The JP=0 signal from the output of counter 780 is supplied to the control input of multiplexer 705 via multiplexer 701 in the state 2 time interval. Responsive to the JP=0 signal, multiplexer 705 connects the zero position character from shift register 205-0 (D) to the input of comparator 709 wherein it is compared to the zero code from generator 707. This is done to insure that an acceptable sequence of directory words is selected for the directory search by a direct access method.

Responsive to the D character from multiplexer 705, comparator 709 produces a high $\overline{ZN}$ pulse. The high $\overline{ZN}$ signal is applied to gate 1011 (FIG. 10A) of sequence control logic 180 via line 151. Gate 1011 is enabled by the high $\overline{ZN}$ and ST2 signals whereby a high D3 signal is supplied from the output of inverter 1020 to flip-flop 1004A in FIG. 10B. The negative transition of the state 2 interval clock pulse CL1 at time $t_{23}$ then causes flip-flop 1004A to be set and also resets flip-flop 1002A. In this manner, the high ST2 signal in waveform 1315 is terminated and the high ST3 signal in waveform 1317 is initiated at time $t_{23}$.

During the state 3 time interval between times $t_{23}$ and $t_{28}$, directory range selector 120 shown in detail in FIG. 4 is operative to determine the lower bound (NL) and the upper bound (NU) of a sequence of directory words responsive to the zero, first and second position characters of the most probable candidate word at the outputs of array 110.

At time $t_{23}$, JP counter 780 in FIG. 7 is in its zero state. The JP=0 output of counter 780 selects the zero position of array 110 from the output of shift register 205-0 and supplies the zero position character (D) to selectors 405 and 415 in FIG. 4 via multiplexer 705 in FIG. 7. The output of selector 405 is connected to the inputs of latches 407, 409 and 411 while the output of selector 415 is connected to the inputs of latches 418, 420 and 422. Range counter and decoder circuit 436 supplies clock signals to selectively enable these latches. At time $t_{23}$, range counter 436 is in its zero state (waveform 1318) whereby signal CLa' is obtained therefrom. Latches 411 and 422 are enabled by the CLa' signal.

The zero position (D) character from shift register 205-0 is inserted into latch 411 via selector 405 and is also inserted into latch 422 via selector 415. occurrence of the first CL2 clock pulse at time $t_{24}$, signal RC is generated by gate 432 responsive to the low $\overline{ST3}$ signal applied to gate 430 and the high CL2 pulse applied to gate 432. Range counter 436 is incremented to its first state by signal RC and clock pulse CLb' is generated. Latches 409 and 420 are enabled by the CLb' pulse. Signal RC is also supplied to the clock input of JP counter 780 via inverter 758. The JP=1 pulse from counter 780 causes the output of shift register 205-1 to be connected to the inputs of selectors 405 and 415 via multiplexer 705. The coded B character signal in this character position is thereby inserted into latches 409 and 420.

The next CL2 clock pulse occurring at time $t_{25}$ increments both range counter 436 and JP counter 780 to their second states as shown in waveforms 1313 and 1318, respectively. Consequently, the second position character C from shift register 205-2 is supplied to selectors 405 and 415 while the CLc' clock pulse is applied to latches 407 and 418. The C character signal from shift register 205-2 is thereby inserted into latches 407 and 418. In the event a zero character output is obtained from shift registers 205-1 or 205-2, selector 405 is responsive to the high ZN signal from comparator 709 to insert a "26" coded signal corresponding to a Z character into latch 207 and selector 415 is operative to insert a "1" signal corresponding to an A character into latch 418.

At time $t_{26}$, the upper bound signal NU corresponding to the characters DBZ is available from latches 411 and 409 and generator 406. Similarly, at time $t_{26}$, the lower bound signal NL corresponding to the characters DBC is available at the outputs of latches 418, 420 and 422. Preparatory to the selection of the first directory word of the sequence defined by the lower bound and upper bound signals, key counter 507 (waveform 1325) in directory access logic 130, shown in FIG. 5, is cleared to its zero state responsive to the low $\overline{ST3}$ signal applied to gate 508 and the high CL1 clock pulse occurring at $t_{27}$ which is applied to gate 510.

Figure 5:
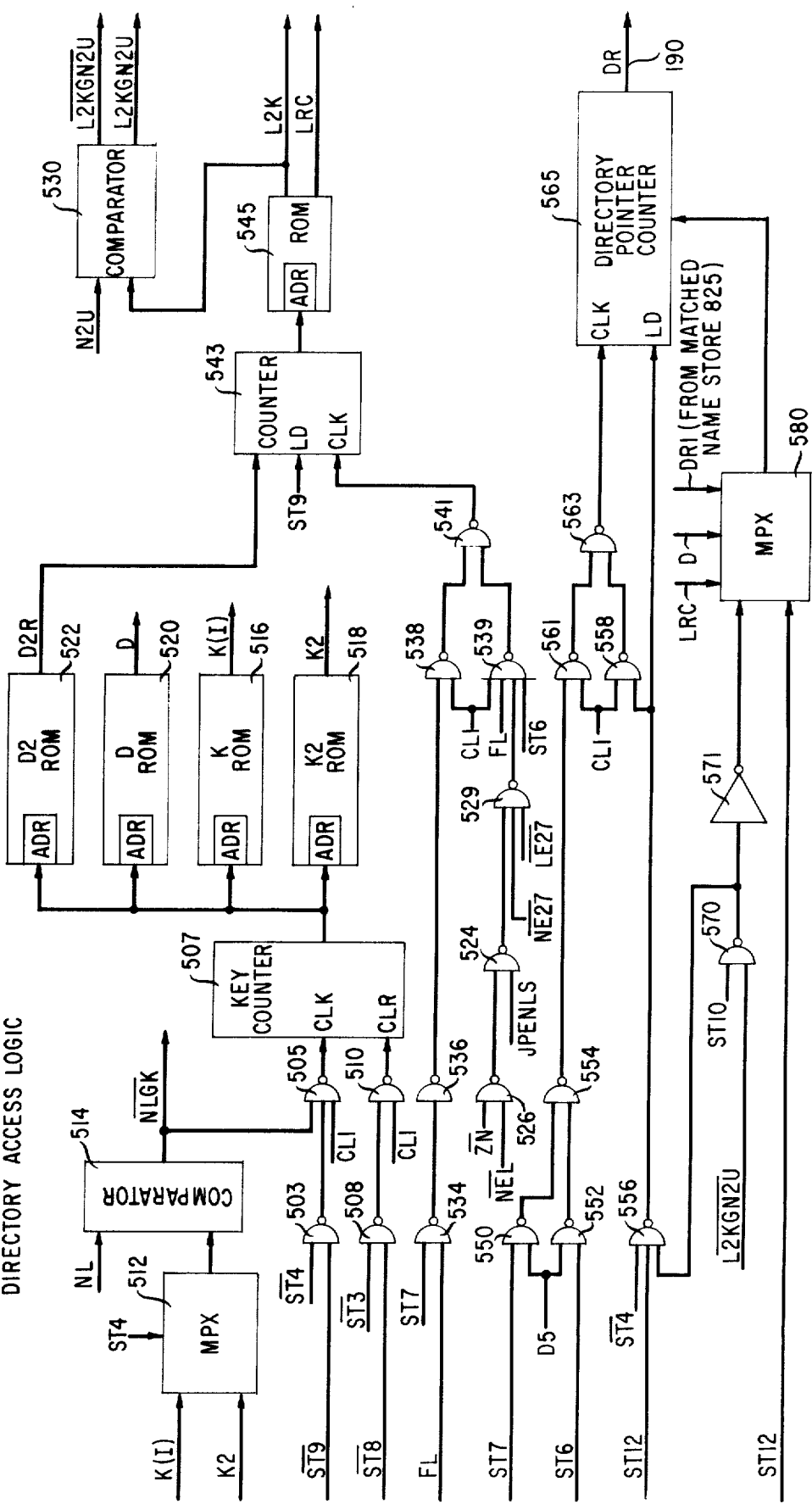
FIG. 5 depicts a detailed block diagram of the directory access logic of FIG. 1.

Directory access logic 130 in FIG. 5 is operative to select the addresses of the directory word sequence defined by the NL lower bound and NU upper bound signals from directory range selector 120. Where the zero position character of the candidate word is not $\phi$, the direct accessing arrangement utilizing K read-only-memory (ROM) 516 and D read-only-memory (ROM) 520 is employed. K read-only-memory 516 contains a list of selected directory words. Each location in memory 516 consists of the zero, first and second characters of the selected key directory words. The first location in K ROM 516 corresponds to the first directory word in directory store 140. The second location in K ROM 516 corresponds to the 128th directory word in the directory store. Similarly, the other locations in K ROM 516 correspond to spaced directory word entries in the directory store. K ROM 516 is used to select the first directory word of the sequence so that the first directory word is within a predetermined range, e.g., 128 words of the lower bound directory word defined by signal NL. D ROM 520 contains a list of directory word addresses for the directory store which addresses correspond to the key ROM 516 locations. Thus, once a key directory word is selected, the output of D ROM 520 may be utilized as the address of the first word of the directory sequence which is within 128 words of the lower limit signal NL.

At time $t_{28}$, the D4 signal from the ST3 output of control flip-flop 1004A in FIG. 10B sets control flip-flop 1006A whereby the ST4 signal shown in waveform 1319 is initiated. Control flip-flop 1004A is reset at this time responsive to the high ST4 signal in the state 4 time interval, multiplexer 512 in FIG. 5 connects the K(I) signal obtained from ROM 516 to one input of comparator 514. The lower bound signal NL from directory range selector 120 is applied to the other input of comparator 514. At this time, the zero, first and second characters of the first directory word location from K ROM 516 are compared to the corresponding characters of the lower bound NL signal from latches 418, 420 and 422.

The high CL1 clock pulse applied to gate 505 between times $t_{29}$ and $t_{30}$ increments key counter 507 responsive to the NL signal applied to comparator 514 being greater than the K(I) signal applied thereto. Thus, at time $t_{29}$, key counter 507 is placed in its first state as shown in waveform 1325. The second location K(I) signal is obtained from ROM 516 and this second location K(I) signal is compared to signal NL in comparator 514. Upon the occurrence of the next CL1 signal at time $t_{31}$, key counter 507 is incremented to its second state and a new K(I) signal is supplied to comparator 514 from K ROM 516. Key counter 507 is successively incremented until it reaches its $n^{th}$ state at time $t_{33}$ in waveform 1325. At this time, the K(I) signal accessed from key ROM 516 is less than the NL signal from directory range selector 120 so that corresponding directory address from D ROM 520 is less than the directory address corresponding to signal NL.

Responsive to the NL signal to comparator 514 being less than or equal to the K(I) code from K ROM 516, signal $\overline{NLGK}$ is obtained from comparator 514 ($t_{33}$ in waveform 1327). At this time, the address of the first word of the directory sequence as addressed by key counter 507 is available as signal D from directory address ROM 520. The D address signal is supplied to the input of directory pointer-counter 565 via multiplexer 580. The first directory address of the sequence is loaded into directory counter pointer 565 at time $t_{35}$ responsive to the low $\overline{ST4}$ signal on gate 556 and the high CL1 signal applied to the clock input of counter 565 via gates 558 and 563. The DR directory address from directory pointer 565 on line 190 (waveform 1329) is applied to address input 621 of directory 620. The DR address accesses the first character of the first directory word of the selected sequence.

Directory address counter 615 is cleared to its zero state at time $t_{35}$ by the high ST4 and CL1 signals applied to gate 609. Responsive to the low output of gate 609, gate 614 provides a high signal to the clear input of counter 615. As indicated in waveform 1331, the output of directory address counter 615 is zero between times $t_{35}$ and $t_{37}$. Responsive to the DR signal and the output of counter 615, the first character of the selected directory word is applied to multiplexer 629 at time $t_{35}$ when the directory address counter 615 is cleared by the the state 4 CL1 clock pulse. Assume for purposes of illustration that the directory word from directory 620 is DAVISRH(27). The characters of this word appear in left to right sequence at the output of directory 620 responsive to the incrementing of counter 615 as indicated in waveform 1335.

The D5 signal is generated in the state 4 interval responsive to the high $\overline{NLGK}$ and ST4 signals applied to gate 1021 in sequence control logic 180 shown in FIG. 10A. At time $t_{36}$, control flip-flop 1008A in FIG. 10B is set, producing the ST5 signal of waveform 1333 and control flip-flop 1006A is reset by the negative transition of the CL1 pulse terminating the ST4 signal in waveform 1319. In this way, the state 4 time interval is terminated and the state 5 time interval during which the selected directory word of the sequence is placed in shift register 640 is initiated.

At time $t_{37}$, directory address counter 615 is incremented to its first state responsive to the high ST5 and CL2 signals applied to gate 605. Multiplexer 629 connects the directory output to the input of register 640 during the ST5 time interval responsive to the high ST5 signal applied to the control input of multiplexer 629 via gates 623 and 627. At time $t_{37}$, the D character from directory 120 is inserted into the seventh position of shift register 640.

At $t_{38}$, counter 615 is incremented by the next CL2 pulse and the A character of the directory word is supplied to the seventh position of shift register 640 and is entered into this position under control of the shift pulse from gate 639 generated by the high ST5 and CL2 inputs to gate 633. Directory address counter 615 is successively incremented by the CL2 pulses during the state 5 time interval as shown in waveform 1331 to produce the sequence of characters indicated in waveform 1335. At time $t_{40}$, the last character (27) from directory 620 is placed in the seventh position of shift register 640 by the leading edge of the CL1 pulse applied to inverter 624.

The first three characters of the directory word, i.e., DAV, are also placed into latches 654, 656 and 658, respectively, during the state 5 time interval under control of LK counter 650 and decoder 652. Counter 650 is cleared to its zero state during the CL1 clock pulse terminating the state 4 time interval through gates 648 and 649. The zero output of LK counter 650 causes the CLA signal to be generated by decoder 652. Between times $t_{35}$ and $t_{37}$, the CLA pulse enables latch 654 so that the D character signal from the output of directory 620 is inserted therein by time $t_{37}$. Responsive to the first CL2 pulse at time $t_{37}$, LK counter 650 is incremented to its first state by gates 644 and inverter 646. The output of decoder 652 is changed so that the CLB signal enables latch 656 and the A character from directory 620 is stored in latch 656 by time $t_{38}$. The CL2 clock pulse at time $t_{39}$ increments counter 650 to its second state whereby latch 658 is enabled by signal CLC from decoder 652 and the V character from directory 620 is entered into latch 658. Gate 644 and decoder 652 are inhibited by the output on line 651 from counter 650 after it is in its second state. The sequential states of counter 650 are shown in waveform 1337.

The outputs of latches 654, 656 and 658 form the LK signal, e.g. DAV, which is representative of the directory word in shift register 640. Comparator 660 compares the LK signal to the upper bound signal NU and thereby determines when the directory search sequence is completed. Until the directory sequence range is exceeded, signal $\overline{LKGNU}$ is obtained from comparator 660 in state 5 time intervals. The $\overline{LKGNU}$ signal is transmitted to gate 1029 (FIG. 10A) in sequence control logic 180 via line 142. Responsive to the high ST5 and $\overline{\text{LKGNU}}$ signals, gates 1029 and 1036 are enabled so that the D6 output from gate 1036 sets control flip-flop 1010A in FIG. 10B at time $t_{41}$. The negative transition of the CL1 clock pulse at time $t_{41}$ also resets control flip-flop 1008A. In this way, the ST5 signal (waveform 1333) is terminated and the ST6 signal (waveform 1339) is initiated at time $t_{41}$.

During the state 6 time interval, the candidate word DBCJ$\phi$A(27)$\phi$ at the N0 through N7 outputs of array 110 are compared to the directory word DAVISRH(27) in shift register 640. Preparatory to the comparison, JP counter 780 in FIG. 7 is cleared to its zero state at time $t_{40}$ by the low $\overline{\text{ST5}}$ signal applied to gate 763 and the high CL1 clock pulse applied to gate 766. The JP=0 signal from counter 780 causes the zero character position output from shift register 205-0 to be applied to comparators 709, 713 and 728 as shown in waveform 1341. The zero character position of the directory word at the output of shift register 640 is applied to comparators 713 and 730. Comparator 709 determines whether the applied position character from array 110 is a $\phi$ character. If it is a $\phi$ character, the character mismatch is ignored and a match is assumed. In this event the ZN output of comparator 709 is high and the $\overline{\text{ZN}}$ output is low. Comparator 713 determines whether the position character from array 110 matches the position character from shift register 640. If there is a match, signal NEL is high and signal $\overline{\text{NEL}}$ is low. Comparator 728 provides a high NE27 signal and a low $\overline{\text{NE27}}$ signal if the character applied from shift register 640 is a coded "27" representative of the end of characters in the candidate word. Similarly, comparator 730 provides a high LE27 signal if the position character from array 110 is a "27" code representative of the end of characters in the directory word in shift register 640. If a "27" code is detected in comparator 728 after all preceding characters match or are ignored, the comparison operation of the state 6 time interval is successful and the address of the matching directory word is stored in matching name store range 160. Directory 620 also provides a coded NLS signal representative of the number of characters in the selected directory word. The NLS signal is compared to the JP signal from counter 780 in comparator 732 which produces a high JPENLS signal and a low $\overline{\text{JPENLS}}$ signal during the last character of the directory word.

As indicated in waveforms 1341 and 1343, the zero position outputs of array 110 and shift register 640 is D. Consequently, a high NEL and a low $\overline{\text{NEL}}$ signal is obtained from comparator 713 as shown in waveform 1345 between times $t_{40}$ and $t_{42}$. Comparator 709 provides a high $\overline{\text{ZN}}$ output, comparator 728 provides a high $\overline{\text{LE27}}$ output and comparator 730 provides a high $\overline{\text{NE27}}$ output.

Since the zero position characters of the candidate array and the selected directory word match, register 640 is shifted right one position upon the occurrence of the next CL1 pulse at time $t_{42}$. Gate 635 provides a high output responsive to a low $\overline{\text{NEL}}$ signal from comparator 713. Gate 637 is enabled at time $t_{42}$ and causes shift register 640 to be shifted one position. In the absence of an output from gate 627, the D character is shifted from the zero position of register 640 into the seventh position thereof and the first position A character appears at the output of register 640 as shown in waveform 1343 between times $t_{42}$ and $t_{44}$.

The low $\overline{\text{NEL}}$ signal is also applied to gate 740 to enable gates 741 and 748 at time $t_{42}$ whereby the JP counter 780 is incremented to its one state. Responsive to the JP=1 signal, the B character output from shift register 205-1 appears at the output of multiplexer 705 as indicated in waveform 1341.

Since the A character coded signal from shift register 640 is not equal to the B character coded signal from array 110, comparator 713 provides a high $\overline{\text{NEL}}$ signal and a low NEL signal. Similarly, the $\overline{\text{ZN}}$ signal from comparator 709, the $\overline{\text{LE27}}$ signal from comparator 728 and the $\overline{\text{NE27}}$ signal from comparator 730 are high while ZN, LE27 and NE27 signals are low. Upon detection of a mismatch between the first position character of the candidate word and the first position character of the selected directory word, the mismatched position value is compared to the position value stored in MI counting latch 940 in FIG. 9 and the greater of the two is inserted therein. Referring to FIG. 9, the JP=1 signal from counter 780 in FIG. 7 is supplied to one input of comparator 970 via multiplexer 967. In the absence of a high ST7 signal or a high ST13 signal, multiplexer 967 connects the JP signal to comparator 970. The output of MI counting latch 940 which was previously reset to $-1$ is supplied to the other input of comparator 970. Since the JP=1 signal is greater than the MI=$-1$ signal from latch 940, the K output of comparator 970 becomes high and the load input to MI counting latch 940 is made high through enabled gate 912 and inverter 921.

At the beginning of the next CL1 clock pulse at time $t_{44}$, gates 923 and 925 are enabled whereby the JP=1 signal is loaded into counting latch 940 as indicated in waveform 1347. The high $\overline{\text{ZN}}$, $\overline{\text{NEL}}$, $\overline{\text{NE27}}$, and $\overline{\text{LE27}}$ signals are applied to gate 1043 (FIG. 10A) in sequence control logic 180 so that the D7 signal becomes high during the state 6 time interval. At time $t_{45}$ control flip-flop 1011A in FIG. 10B is set and control flip-flop 1010A is reset so that the state 6 time interval is terminated and the state 7 time interval is initiated as shown in waveform 1349.

In the state 7 time interval, the mismatched position MI is compared to the best mismatched position MMI previously stored in the current and preceding directory searches and the greater position value of MI and MMI is stored. In this manner, the best mismatched position store is updated. This is accomplished in candidate modifier logic 170 of FIG. 9 responsive to the ST7 control signal. Referring to FIG. 9, the state of multiplexer 967 is changed responsive to the high ST7 control signal at time $t_{45}$ so that the output of MMI counting latch 910 is supplied to one input of comparator 970. The MMI output is compared with the MI output from MI counting latch 940 during the state 7 interval. A high signal K is obtained from comparator 970 since the MMI latch was previously reset to its $-1$ state as indicated in waveform 1351, and the MI latch is now set to its one state as indicated in waveform 1347. The high K signal from comparator 970 enables gate 903 at time $t_{46}$ whereby the MI=1 signal is loaded into MMI counting latch 910 as indicated in waveform 1351.

During the state 7 time interval, gates 1023 and 1025 are enabled by the coincidence of the ST7 and $\overline{\text{FL}}$ signals. The $\overline{\text{FL}}$ signal is produced in the preceding state 5 interval by a high ST5 signal applied to FL flip-flop 1035A in FIG. 10B. The high $\overline{\text{FL}}$ signal indicates that the directory store is accessed on the basis of the zero, first and second position characters. The high D5 output of gate 1025 is applied to the input of control flip-flop 1008A in FIG. 10B which is set at time $t_{47}$. Control flip-flop 1011A is reset at this time and the state 5 time interval is reinitiated. The D5 signal from gate 1025 is also applied to gate 550 in FIG. 5. During the CL1 clock pulse between times $t_{46}$ and $t_{47}$, gates 550, 554, 561 and 563 are enabled whereby directory pointer counter 565 is incremented. In this manner, the next directory word of the sequence is selected from directory 620 during the preceding state 5 interval.

In each succeeding state 5 interval of the directory search mode, the first character of the selected directory word in directory 620 is addressed by the DR signal from directory pointer counter 565 and the zero output of directory address counter 615. Multiplexer 629 connects the output of directory 620 to the input of shift register 640 under control of gates 623 and 627. Responsive to the CL2 clock pulses applied to gate 625 and the clock pulses applied to gate 626, the successive characters of the selected directory word are shifted into register 640. The zero, first and second position characters are latched into latches 654, 656 and 658, respectively, as previously described and the LK signal from these latches is compared to the upper bound signal NU in comparator 660.

In the state 6 time intervals of the directory search mode, the characters of the selected directory word in shift register 640 are compared to the characters of the candidate word from array 110 in left to right order as described with respect to the first directory search. Upon detection of a mismatched character position MI, the detected mismatched position is compared to the mismatched position previously stored in MI counting latch 940. The greater position value is retained in MI counting latch 940. Thus, at the end of the directory search, MI counting latch 940 stores the greatest mismatched position value i.e., the rightmost first occurring mismatched position for the directory search sequence. This rightmost first occurring mismatched position corresponds to the closest mismatched word of the directory word sequence, that is, the directory word having the greatest number of successive matched characters.

In the event the successive characters of the candidate word from array 110 match the successive characters of the directory word, address signal DR from directory pointer-counter 565 is inserted into matched name store 825 in FIG. 8. Comparator 732 compares the output of JP counter 780 to the NLS output of directory 620 since the NLS signal is applied to comparator 732 via selector 794 in state 6. The NLS signal represents the position of the last character of the selected directory word from store 620. During the comparison of the character of the candidate word with the last (NLS) character of the directory word from shift register 640, the JPENLS output of comparator 732 is a high signal. Since the compared last characters match and the previous characters matched, the NEL output of comparator 713 is high and the $\overline{NEL}$ output of comparator 713 is low.

Gate 803 in the matched name logic and store of FIG. 8 is enabled by the low $\overline{NEL}$ signal from comparator 713. The high output of gate 803, the high JPENLS signal, and the high ST6 signal enable gate 810 during the next CL1 clock pulse Responsive to the high output of gate 810, gate 812 is enabled and match counter 821 is incremented since there is a high $\overline{ST12}$ signal applied to the up/down input of counter 821. The write input to matched name store 825 is also enabled via inverter 819 so that the directory address DR of the matching directory word is inserted into the first position of store 825 as addressed by the output of match counter 821.

Upon detection of a match in the last character position, the low $\overline{NEL}$ signal from comparator 713 is applied to gate 1015 in the sequence control logic of FIG. 10A. Responsive to the low $\overline{NEL}$ signal and the high JPENLS signal, gates 1015, 1016, 1017, 1019 and 1025 are enabled to provide a high D5 signal which terminates the state 6 time interval by resetting control flip-flop 1010A in FIG. 10B and initiates the state 5 time interval by setting control flip-flop 1008A at the negative transition of the next state 6 CL1 pulse. The next directory word from directory 620 may thus be accessed for comparison with the candidate word from array 110.

Each selected directory word of the sequence is compared to the candidate word from array 110 as previously described. When the numerical values of the coded zero, first and second characters of the selected directory word placed into latches 654, 656 and 658, respectively, exceed the upper bound signal NU in a state 5 time interval comparator 660 produces a high LKGNU signal as shown in waveform 1353 at $t_{48}$. In the example of Table 1, the upper bound signal NU from directory range selector 120 of FIG. 4 is DBZ. When the selected directory word generates an LK signal corresponding, for example, to DEC, the directory search mode is completed.

If matching directory words were found during the preceding directory search, match counter 821 is in a nonzero state and zero code detector 828 provides a high $\overline{ZM}$ output. During the last state 5 time interval of the directory search, a high LKGNU signal appears at the output of comparator 660. The LKGNU signal from comparator 660 in FIG. 6 and the $\overline{ZM}$ signal from zero code detector 828 in FIG. 8 enable gate 1060 in the sequence control logic of FIG. 10A whereby a high D12 signal appears at the output of gate 1063. Responsive to the termination of the last state 5 interval CL1 clock pulse, control flip-flop 1019A in FIG. 10B is set and control flip-flop 1008A is reset. The directory retrieval mode in which the matching directory addresses are used to retrieve associated information from directory 620 is thereby initiated.

Responsive to a low $\overline{ST12}$ signal on the up-down input to match counter 821 during the state 12 time interval, the counter is set to decrement its state on the occurrence of a clock input signal. The clock signal is provided by gates 807 and 812 responsive to high $\overline{ZM}$ and CL1 signals during the state 12 interval. The last entered directory word address in match name store 825 is addressed by counter 821 and read out therefrom as address signal DR1, which address signal is supplied to address input 621 of directory 620 via directory pointer counter 565. At the end of the preceding state 5 interval, a low signal $\overline{ST5}$ enabled gate 612; and, responsive to the state 5 interval CL1 signal applied to gate 613, directory address counter 615 was cleared to its zero state. Responsive to the DR address signal from directory pointer counter 565 and the output of directory address counter 615 which is successively incremented by the CL2 clock pulses applied via gate 607, the information associated with the matched directory word is retrieved from directory 620 and applied to speech synthesizer 680 via line 610. Speech synthesizer 680, as is well known in the art, is operative to produce a spoken output message signal which includes the information associated with the matched directory name. Such information, including the subscriber telephone number or subscriber address, is thereby transmitted to the inquirer via message interface 101.

If there is more than one matching directory word match counter 821 is in a nonzero state and is decremented by the ST12 signal on gate 807 whose output is applied to the clock input of match counter 821 by CL1 clock pulses via gate 812. Responsive to the decremented address from counter 821, the next directory word address is read from matched name store 825 so that the information associated with this directory word is retrieved from directory 620. When match counter 821 is decremented to its zero state, zero code detector 828 produces a high ZM signal which is supplied to gate 1075 in the sequence control logic of FIG. 10A. Responsive to the coincidence of the high ST12 and ZM signals, gates 1075 and 1079 are enabled whereby control flip-flop 1023A is set and the state 14 time interval is initiated. The state 14 interval is repeatedly reinitiated by the low $\overline{ST14}$ signal applied to gate 1079. The circuit of FIG. 1 remains in state 14 until the next request for subscriber information is initiated.

Assume for purposes of illustration that there is no matching directory word detected in the first directory search. In this event, the candidate word is modified by substituting other probable characters from array 110. Since the closest mismatched word is mismatched in the first position, changes in positions to the right of the first position will not result in matching directory words. Therefore, in the first candidate word change mode, a probable character substitution is made in the first mismatched position if there are probable characters available in the first position. The candidate word change mode is entered by the initiation of the state 13 time interval. During the last state 5 interval of the first directory search, in which the LKGNU signal shown in waveform 1407 of FIG. 14 is generated in comparator 660, the ZM signal from zero code detector 828 (waveform 1409) in FIG. 8 is high. Responsive to the high ST5 (waveform 1403) LKGNU, and ZM signals, gate 1066 in sequence control logic 180 shown in FIG. 10A is enabled and a high D13 signal is obtained from the output of gate 1071. This D13 signal sets flip-flop 1021A in FIG. 10B producing a high ST13 signal upon the termination of the state 5 CL1 clock pulse (time $t_1$ on waveform 1401 of FIG. 14). At this time, control flip-flop 1008A is also reset. In the initiated state 13 time interval, the mismatched position MI is 1 as shown for the first directory search in Table 2. This is so because the closest mismatched word found during the directory search is DAVISRH for the directory search candidate word DBCJ$\phi$A. DAVISRH is also the best mismatched word whereby MMI counting latch 910 in FIG. 9 contains a 1. W counting latch 960 was previously reset to its −1 state.

Responsive to the high ST13 signal on its control input, multiplexer 967 connects the output of W counting latch 960 to one input of comparator 970. The MI signal from latch 940 is supplied to the other input of comparator 970. Since the output of the W latch is −1 while the output of the MI latch is 1, a high $\overline{MIEW}$ signal (waveform 1413) is obtained by time $t_2$ from the output of inverter 971 connected to comparator 970. Responsive to the 1 output from MI counting latch 940, −1 code detector 962 provides a high $\overline{MIEN}$ signal (waveform 1415). The high $\overline{MIEN}$ and $\overline{MIEW}$ signals enable gate 323 in the state 13 time interval whereby the MI=1 signal from latch 940 is supplied to the control inputs of decoder 319 via multiplexer 331.

Responsive to the MI=1 signal, decoder 319 is operative to connect its input to line SJ1. During the CL1 clock pulse in state 13, gate 317 is enabled whereby a single shift pulse (waveform 1417) is applied to shift registers 205-1 and 206-1 via line SJ1 between times $t_2$ and $t_3$. In this manner, shift registers 205-1 and 206-1 are shifted one place to the right. The B character formerly at the output of register 205-1 is inserted into the seventh position of this register and the V character formerly in the first position of shift register 205-1 is shifted to the zero position and appears at the output of register 205-1. The post number corresponding to the B character, i.e., 1, now appears in the zero position of shift register 206-1 and at its output. In accordance with the invention, the character in the mismatched position of array 110 is replaced by the next most probable character therein in the absence of the detection of matching directory words in the preceding directory search. All other positions of the candidate word array remain unchanged.

The $\overline{MIEN}$ and $\overline{MIEW}$ signals from candidate modifier logic 170 of FIG. 9 are also applied to gate 1083 in the sequence control logic of FIG. 10A via line 171. Responsive to the high $\overline{MIEN}$ and $\overline{MIEW}$ signals during the state 13 time interval, a high D15 signal appears at the output of inverter 1085. At the termination of the state 13 CL1 clock pulse (time $t_3$ in FIG. 14), control flip-flop 1025A in FIG. 10B is set. Signal ST15 becomes high as shown in waveform 1419, and control flip-flop 1021A is reset. In this manner, the state 15 time interval is initiated during which the new available character at the output of shift register 205-1 of FIG. 1 is compared to $\phi$ from zero code generator 707 in comparator 709.

The MI=1 signal from MI counting latch 940 of FIG. 9 is supplied to the control input of multiplexer 705 responsive to the high ST15 control signal from control flip-flop 1025A in FIG. 10B. The output of shift register 205-1 is thereby connected to one input of comparator 709. The output of multiplexer 705 is shown in waveform 1421. Since the output of shift register 205-1 is V at this time, comparator 709 produces a high $\overline{ZN}$ signal (waveform 1425) and low ZN signal. Flip-flop 787 is set by a high ZN signal applied to its level input and provides ZN1 and $\overline{ZN1}$ signals. The high $\overline{ZN1}$ signal from flip-flop 787 is applied to gate 1008 in sequence control logic 180 of FIG. 10A during this state 15 time interval since no high ZN signal was produced. Consequently, a high D2 signal (waveform 1425) is obtained from gate 1009. At the termination of the CL1 clock pulse of the state 15 time interval ($t_5$ in FIG. 14), control flip-flop 1002A in FIG. 10B is set and control flip-flop 1025A is reset. At this time, the modified candidate word at the output of array 110 is DVCJ$\phi$A as shown in column 7 of Table 2.

The second directory search mode is entered by the initiation of the state 2 time interval. In the state 2 time interval of the second and the succeeding directory searches, MI counting latch 940 is reset to its minus 1 state so that the rightmost first occurring mismatched position of the new directory search may be determined and entered therein. Match counter 821 in FIG. 8 is also cleared to its zero state preparatory to the storage of detected matching directory word addresses in matched name store 825. MMI counting latch 910, however, is not reset since this latch stores the rightmost first occurring mismatch position of the best mismatched word of all preceding directory searches.

In the second directory search, a new sequence of directory words is selected for the modified candidate word DVCJ$\phi$A at the output of array 110 and each directory word of the sequence is compared to the modified candidate word as described with respect to the first directory search. In accordance with Table 2, no matching directory word is detected during the second directory search. Also, in accordance with Table 2, the closest mismatched word found during the second directory search is DVORAKDL. The rightmost first occurring mismatched position stored in MI counting latch 940 at the end of the second directory search is MI = 2. The best mismatch word changes from DAVISRH to DVORAKDL and a best mismatch position MMI = 2 is found for the latter word. The new best first mismatched position is stored in MMI counting latch 910. Upon reaching the upper bound NU of the second directory range in a state 5 time interval, a high LKGNU signal is produced by comparator 660 (waveform 1407 between times $t_5$ and $t_6$). The high ZM signal from zero code detector 828 and the high LKGNU signal from comparator 660 enable gate 1066 of FIG. 10A in this state 5 time interval so that a high D13 signal is produced by gate 1071. Upon the occurrence of the state 5 CL1 clock pulse at $T_6$ control flip-flop 1021A in FIG. 10B is set to initiate the state 13 time interval of the second candidate change mode. Control flip-flop 1008A is reset so that the second directory search mode is terminated at this time.

During the CL1 clock pulse of the state 13 of the second candidate word change mode, between times $t_7$ and $t_8$ in FIG. 14, shifted register 205-2 is shifted right one position by the shift pulse shown in waveform 1417. The C character at the output of shift register 205-2 is thereby replaced by the next available character, i.e., Z, since the mismatched position is the second position as previously described. The character Z at the output of multiplexer 705 (waveform 1421) is found not to be a $\phi$ character in the succeeding state 15 time interval of the second candidate word change mode between times $t_8$ and $t_{10}$. The modified candidate word formed in the second candidate word change mode is DVZJ$\phi$A as shown in column 7 of Table 2.

The third directory search mode is then initiated using the modified candidate word DVZJ$\phi$A of column 2 of Table 2. As shown in Table 2, the closest mismatched word of the third directory search in which no matching directory words are detected is DVORAKDL. The MI mismatch position is 2 and the best mismatch position of all previous searches is 2. During the state 7 time interval just after the state 6 interval comparison of the candidate word DVZJ$\phi$A with the directory word DVORAKDL, gate 208 in FIG. 2 is enabled by signal K since the MMI output of latch 910 applied to comparator 970 via multiplexer 967 is greater than the MI = 1 output of MI counting latch 940. Responsive to the low output of gate 208, the post numbers at the outputs of registers 206-0 through 206-7 are inserted into latch 213. In this manner, the candidate word corresponding to the best mismatched word of the current and preceding directory searches may be accessed at a later time. The third directory search mode is terminated at the end of the state 5 time interval in which a high LKGNU signal is obtained from comparator 660. This state 5 time interval ends at time $t_{12}$ in FIG. 14.

In the first state 13 time interval of the third candidate word change mode (between times $t_{12}$ and $t_{14}$ in FIG. 14) the MI = 2 signal is supplied to the control input of decoder 319 via multiplexer 331 as previously described. Since a high $\overline{\text{MIEN}}$ signal (waveform 1415) is obtained from detector 962 and a high $\overline{\text{MIEW}}$ signal (waveform 1413) is obtained from comparator 970, gate 317 supplies a shift pulse (waveform 1417 at time $t_{13}$) to registers 205-2 and 206-2 via decoder 319 and line SJ2. The contents of shift registers 205-2 and 206-2 are thereby shifted right one position. The Z character at the output of shift register 205-2 is replaced by the first $\phi$ character at time $t_{13}$ as indicated in waveform 1421 and the state 15 time interval is initiated at $t_{14}$ as previously described.

In the state 15 time interval between times $t_{14}$ and $t_{23}$, the MI = 2 signal from MI counting latch 940 causes multiplexer 705 to connect the output of shift register 205-2 to one input of comparator 709. Since the $\phi$ character appears at the output of shift register 205-2 at this time, high ZN and low $\overline{\text{ZN}}$ signals are obtained from comparator 709. Flip-flop 787 is set by a high ZN signal from comparator 709 and a high ZN1 signal appears at its one output.

The high ZN1 signal is applied to gate 321 which causes multiplexer 331 to pass the MI = 2 signal from its input to the control inputs of encoder 307 and decoder 319. Encoder 307 is operative at this time to connect the output of shift register 206-2 to the input of gate 309. As long as the output of encoder 307 is a nonzero post number, gate 309 produces a high signal (waveform 1427 between times $t_{14}$ and $t_{18}$) which, in combination with the high ZN signal on gate 311 causes the successive CL2 clock pulses occurring during the state 15 time interval to be applied to the input of decoder 319.

Decoder 319 connects its input to line SJ2 so that the six successive CL2 clock pulses between times $t_{15}$ and $t_{18}$ are applied from gate 311 to the shift control inputs of registers 205-2 and 206-2 in FIG. 2. The resulting shift pulses are shown in waveform 1417 and the characters at the output of shift register 205-2 are shown in waveform 1421. At time $t_{13}$, the Z character at the output of shift register 205-2 is replaced by a $\phi$ character. The six $\phi$ characters are shifted between times $t_{15}$ and $t_{16}$. The C character is shifted to the output of register 205-2 at time $t_{17}$ when the zero post number appears at the output of register 206-2. No more shift pulses are applied to registers 205-1 and 206-1 because gate 309 is inhibited by the zero post number from the output of shift register 206-2. At time $t_{17}$, the most probable character of shift register 205-2, i.e., C, is in the zero position of shift register 205-2. In this way, the most probable character of the mismatched position of the candidate word is returned to the candidate word after all available characters in that position have been used for substitution in directory searches.

The high ZN1 signal from flip-flop 787 is applied to gate 915 in FIG. 9 during the state 15 time interval. Gates 915 and 928 are enabled and, responsive to the CL1 clock pulse between times $t_{22}$ and $t_{23}$ during the state 15 time interval, a clock pulse is applied to MI counting latch 940 via gates 931 and 925. MI counting latch 940 is thereby decremented from its second state to its first state. The high ZN1 signal from flip-flop 787 is also applied to gate 1069A of the sequence control logic shown in FIG. 10A. Gate 1069A is enabled during the state 15 time interval whereby a high D13 signal is produced by gate 1071. The state 15 time interval is terminated upon the negative transition of the state 15 time interval CL1 pulse at time $t_{23}$ and the state 13 time interval is reinitiated by the setting of control flip-flop 1021A in FIG. 10B responsive to the high D13 signal.

During the reinitiated state 13 time interval between times $t_{23}$ and $t_{25}$ in which signal ST13 is high (waveform 1411), gate 323 is enabled by the high $\overline{\text{MIEN}}$ and $\overline{\text{MIEW}}$ signals from latch 940 and comparator 970. Responsive to the low output of gate 323 the MI=1 signal is supplied to the control input of decoder 319 via multiplexer 331. Gate 317 produces an output pulse during the CL1 clock pulse of this state 13 time interval between times $t_{24}$ and $t_{25}$, and the pulse from gate 317 (waveform 1417) is applied to shift registers 205-1 and 206-1 via line SJ1. The contents of shift registers 205-1 and 206-1 are shifted right one position. The V character formerly at the output of shift register 205-1 is inserted into the seventh position of this register and the E character from the first position of shift register 205-1 is inserted into the zero position thereof and appears at the register output. The post number corresponding to the E character, i.e., 2, appears at the output of shift register 206-1.

The state 15 time interval is reinitiated at time $t_{25}$ and the E character from shift register 205-1 is supplied via multiplexer 705 (waveform 1421 between times $t_{25}$ and $t_{27}$) to one input of comparator 709. Since the E character does not match the $\phi$ code from code generator 707, comparator 709 produces a high $\overline{\text{ZN}}$ signal between times $t_{25}$ and $t_{27}$. Flip-flop 787 is reset by the low ZN signal from comparator 709 and the $\overline{\text{ZN1}}$ signal from flip-flop 787 enables gate 1008 in sequence control logic 180 of FIG. 10A so that a high D2 signal (waveform 1425) is generated by gate 1009. The state 15 CL1 clock pulse terminates the candidate word change mode by resetting control flip-flop 1025A in FIG. 10B at time $t_{27}$. The fourth directory search mode is entered at this time by the setting of control flip-flop 1002A responsive to the high D2 signal and the state 15 CL1 clock pulse.

The modified candidate word formed during the third candidate word change mode is DECJ$\phi$A as shown in column 7 of Table 2. In the fourth directory search mode, a new sequence of directory words is selected responsive to the zero, first and second characters (DEC) of the modified candidate word. Each selected directory word of this sequence is compared to the candidate word DECJ$\phi$A(27)$\phi$ from array 110 as shown in FIG. 12; and the search mode is terminated when the upper range (NU) of the directory word sequence is reached. As shown in Table 2, no matching directory words are found in the fourth directory search. The closest mismatched word is DECNA. The rightmost mismatched position is the third position so that MI counting latch 940 is in its third state. The best mismatched word of this current search and the preceding searches is DECNA since the mismatch is in the third position while the rightmost mismatch for the preceding searches was in the first and second positions. Thus, during the state 7 time interval following the state 6 time interval comparison of the candidate word DECJ$\phi$A with the directory word DECNA, gate 208 in FIG. 2 is enabled and the post numbers of this candidate word from the outputs of registers 206-0 through 206-7 are stored in latch 213. This permits the candidate word DECJ$\phi$A corresponding to the best mismatched word found thus far (DECNA) to be retrieved at a later time.

Figure 6:
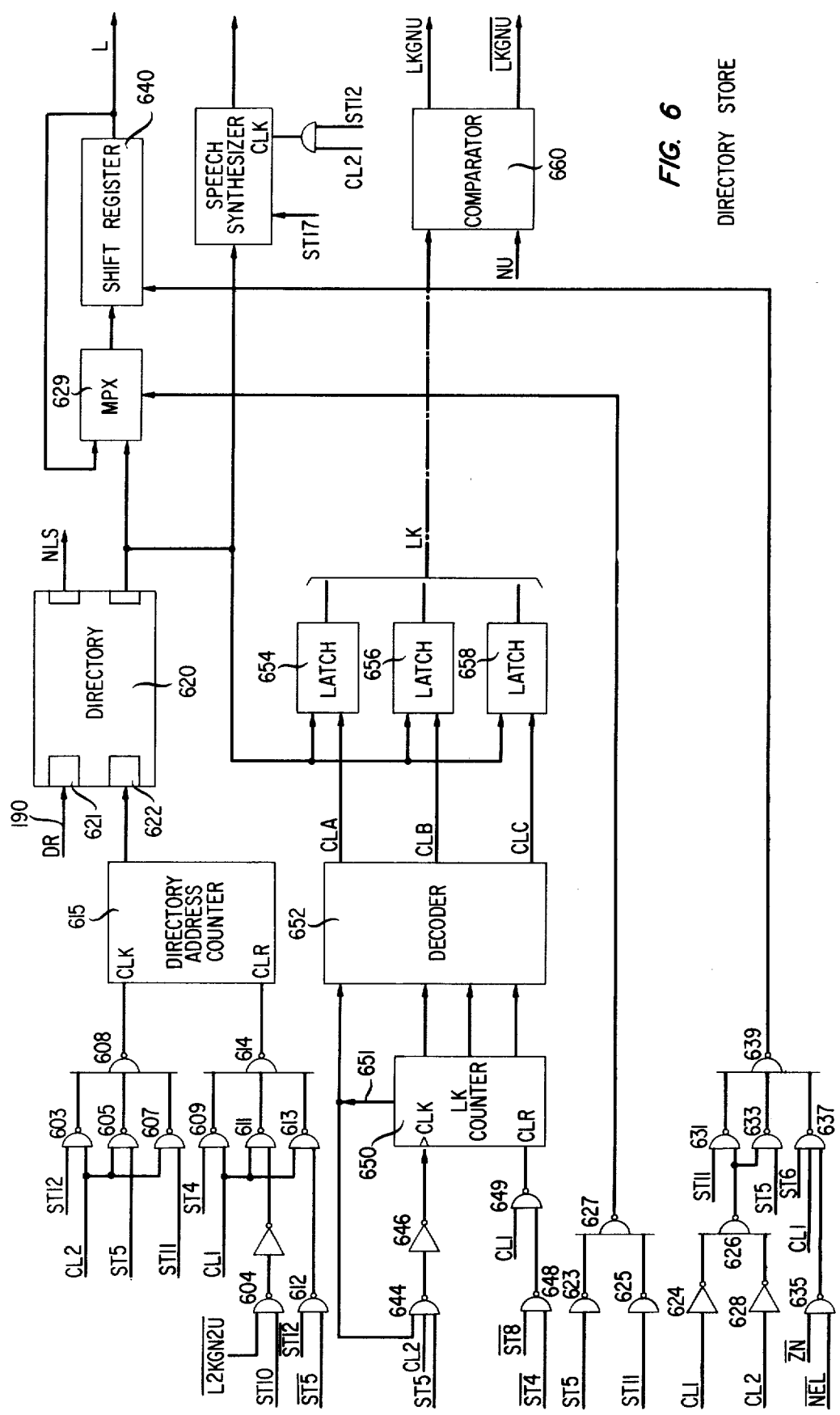
FIG. 6 depicts a detailed block diagram of the directory store of FIG. 1.

At the end of the state 5 time interval in which a high LKGNU signal is produced at the output of comparator 660 in FIG. 6, the fourth directory search mode is terminated and the fourth candidate word change mode is initiated by the setting of control flip-flop 1021A in FIG. 10B responsive to the D13 signal from gate 1071 of FIG. 10A. At this time, MI counting latch 940 is in its third state and comparator 970 produces an $\overline{\text{MIEW}}$ signal responsive to the comparison of the output of W counting latch 960 (W=-1) with the output of MI counting latch 940 (MI=3). Gate 323 in candidate selector 115 of FIG. 3 is enabled by the high $\overline{\text{MIEN}}$ and $\overline{\text{MIEW}}$ signals whereby the MI=3 signal is supplied to the control input of decoder 319. Decoder 319 now connects its input of the SJ3 line. The state 13 time interval CL1 pulse enables gate 317 whereby a single shift pulse is applied to shift registers 205-3 and 206-3. The contents of these registers are shifted right one position so that the J character at the output of shift register 205-3 is replaced by a $\phi$ character. In the succeeding state 15 interval, the presence of a $\phi$ character is detected. Shift registers 205-3 and 206-3 are shifted right so that the most probable character (J) is returned to the output of shift register and MI counting latch 940 is decremented to its 2 state responsive to the ZN1 signal applied to gate 915 in FIG. 9. The state 13 time interval is reinitiated and the contents of shift registers 205-2 and 206-2 are shifted right one position. After the shift the output of register 205-2 is the Z character and the output of register 206-2 is the post number (1) corresponding to the Z character. The C character formerly at the output of shift register 205-1 is inserted into the seventh position of this register and the corresponding post number (0) is inserted into the seventh position of shift register 206-2.

The state 15 time interval is then reinitiated and the Z character at the output of shift register 205-1 is compared to the $\phi$ signal from generator 707 in comparator 709 of FIG. 7. Responsive to the comparison of the Z character and the $\phi$ signal, the $\overline{\text{ZN}}$ output of comparator 709 is high and the $\overline{\text{ZN}}$ output is low. Flip-flop 787 remains reset and the high $\overline{\text{ZN1}}$ output terminates the candidate word change mode. The high $\overline{\text{ZN1}}$ signal initiates the fifth directory search mode by setting control flip-flop 1002A in FIG. 10B via gates 1008 and 1009 in FIG. 10A at the termination of the CL1 clock pulse of state 15 interval. Control flip-flop 1025A is reset at this time.

In the fifth directory search, the candidate word DEZJ$\phi$A is compared to a sequence of directory words chosen in directory range selector 120 on the basis of the zero, first and second position characters (DEZ) at the outputs of array 110. In accordance with Table 2, no matching directory words are detected in the fifth directory search. The closest mismatched directory word in this sequence is DESMETRE. The mismatched position for the closest mismatched work is MI=2. The best mismatched word of the directory searches remains DECNA since its mismatched position in MMI=3. The best mismatched word changes only if MI becomes greater than MMI(4).

When the LKGNU signal is produced by comparator 660 in the directory store logic of FIG. 6 in a state 5 time interval, the fifth candidate word change mode is entered by initiating a state 13 time interval. In this state 13 time interval, multiplexer 331 in FIG. 3 applies the MI=2 signal from MI counter 940 in FIG. 9 to the control input of decoder 319 so that the input of decoder 319 is connected to the SJ2 line. Gate 317 is enabled since the high $\overline{\text{MIEN}}$ signal is produced by code detector 962 and comparator 970 produces a high $\overline{\text{MIEW}}$ signal responsive to the unequal outputs of latches 940 and 960. The CL1 clock pulse applied to gate 317 in the ST13 time interval is supplied to shift registers 205-2 and 206-2 whereby the Z output of register 205-2 is replaced by the next $\phi$ character and the corresponding post number of the $\phi$ character (2) appears at the output of shift register 206-2. Gate 1083 in the sequence control logic of FIG. 10A is enabled to terminate the ST13 time interval and to initiate an ST15 time interval by resetting control flip-flop 1021A and setting control flip-flop 1025A in FIG. 10B.

At the beginning of the ST15 time interval, the MI=2 signal is supplied to multiplexer 705 via multiplexer 701 so that the $\phi$ character from the output of register 205-1 is compared to the $\phi$ code from $\phi$ code generator 707 in comparator 709. As a result of the comparison, comparator 709 produces a high ZN signal and a low $\overline{\text{ZN}}$ signal. Flip-flop 787 is set by the high ZN signal. The high ZN1 signal from flip-flop 787 and the high MIEN and MIEW signals are applied to gate 321 which causes multiplexer 331 to pass the MI=2 signal from its input to the control inputs of encoder 307 and decoder 319. Encoder 307 is operative at this time to connect the output of shift register 206-2 to the input of gate 309. As long as the output of encoder 307 is a nonzero post number, gate 309 produces a high signal which, in combination with the high ZN1 signal on gate 311, causes the successive CL2 clock pulses occurring during the state 15 time interval to be applied to the input of decoder 319. Decoder 319 connects its input to line SJ2 so that the successive CL2 clock pulses are applied to the shift control inputs of registers 205-2 and 206-2 in FIG. 2. The contents of these registers are successively shifted to the right until a 0 post number code appears as the output of register 206-2. At this time, the most probable character of the second character position, i.e., C, is in the zero position of shift register 205-2. In this way, the most probable character of the mismatched position of the candidate word is returned to the candidate word in the absence of a probable character in that position for substitution in the candidate word of the preceding directory search.

Gates 915 and 928 in FIG. 9 are enabled during the state 15 time interval by the high ZN1 signal applied from flip-flop 787 to gate 915. Upon the occurrence of the state 15 time interval CL1 clock pulse, gates 931 and 925 in FIG. 9 are enabled and MI counting latch 940 is decremented to the MI=1 state by the high output of gate 925 applied to the clock input of counter latch 940. The state 13 time interval is reinitiated and the contents of shift register 205-1 and 206-1 are shifted right one position responsive to the operation of gate 317 and decoder 319 as previously described. The E character at the output of shift register 205-1 is thereby replaced by the next $\phi$ character.

The state 15 time interval is reinitiated so that the most probable character of shift register 205-1 is shifted to the output of this register as aforementioned via encoder 307, gates 309 and 311, and decoder 319. MI counting latch 940 is again decremented to its MI=0 state and the state 13 time interval is reinitiated.

In the reinitiated state 13 time interval, the MI=0 signal is applied to the control input of decoder 319 whereby a single shift pulse from gate 317 is supplied to shift registers 205-0 and 206-0 via line SJ0. These shift registers are shifted to the right one place so that the B character appears at the output of shift register 205-0. Since the B character from shift register 205-0 is not a $\phi$ character, the candidate word change mode is ended in the next state 15 time interval and the sixth directory search mode is started with the modified candidate word BBCJ$\phi$A.

As shown in Table 2, the directory search and candidate word change mode sequences continue as previously described without detection of matching directory words. At the end of the thirteenth directory search mode in which the candidate word is PEZJ$\phi$A, the closest mismatched word is PEZDIRTZ. Since the closest mismatched position is MI=3, the best mismatched word DECNA is retained together with the best mismatched position MMI=3.

In the thirteenth candidate word change mode, the J character in the third position of the candidate word (shift register 205-3) is replaced by the next available character. This next available character, however, is a $\phi$ character. The J is reinserted at the output of register 205-3 and the next available character for the second position (shift register 205-2) is shifted to the output of register 205-2. Since this character is also a $\phi$ character, shift register 205-2 is shifted to the right until the most probable character, i.e., C, appears at its output. The first position character is then changed by shifting shift register 205-1 one place to the right. The character at the output of shift register 205-1, however, becomes a $\phi$ character and the most probable character in this position, i.e., B, is shifted to the output of register 205-1. The zero position register is then shifted one place to the right. The $\phi$ character replacing the P at the output of register 205-0 causes MI counting latch 940 in FIG. 9 to be decremented to its minus 1 state in a state 15 time interval via gates 915, 928, 931 and 928.

Responsive to the minus 1 state of counter 940, code detector 962 produces a high MIEN signal. Since W counting latch 960 was initially reset to its minus 1 state, a high WEN signal is obtained from code detector 964. In the following state 13 time interval, the MIEN and WEN signals from latching detectors 962 and 964, respectively, enable gate 305 in the candidate selector logic of FIG. 3. One input of each of comparators 301-0 through 301-7 receives an output IP from latch 213 in FIG. 2. As aforementioned, latch 213 stores the post numbers of the best candidate word of all the preceding directory searches as indicated in column 5 Table 2. The best mismatched word is DECNA and the candidate word corresponding thereto is DECJ$\phi$A. Consequently, the post numbers stored in latch 213 are 02000000. The post numbers P at the output of registers 206-0 through 206-7 at this time are 30000000, respectively.

The 3 output of shift register 206-0 and the 0 output from line IP0 of latch 213 are compared in comparator 301-0. Since they are not equal, a high signal is supplied to gate 303-0 which is operative on the occurrence of the first CL2 clock pulse to produce a shift pulse on line SJ0. Similarly, the 0 output of shift register 206-1 is not equal to the 2 output from line IP1 of latch 213 and gate 303-1 provides a shift pulse on line SJ1 upon the occurrence of the first CL2 clock pulse. The outputs of comparators 301-2 through 301-7 at this time are low so that shift pulses are absent on lines SJ-2 through SJ-7. Shift registers 205-0 about 206-0 are shifted one place to the right responsive to the pulse on line SJ-0 and shift registers 205-1 and 206-1 are similarly shifted one place to the right responsive to the pulse on line SJ-1.

As a result of the operation of comparator 301-0 and gate 303-0, shift registers 205-0 and 206-0 are shifted to the right five positions until the output of shift register 206-0 matches the IP0 output of latch 213. In like manner, shift registers 205-1 and 206-1 are shifted two places to the right until the output of shift register 206-1 matches the 2 output of line IP1. At the end of this state 13 time interval, the candidate word DECJ$\phi$A which corresponds to the best mismatched word of the preceding directory searches appears at the output of candidate array 110. The mismatched position MMI from counting latch 910 is inserted into W counting latch 960 responsive to the high MIEN and WEN signals applied to gate 937 in the state 13 time interval. The output of enabled gate 937 causes the MMI=3 signal from MMI counting latch 910 to be loaded into W counting latch 960. In succeeding directory searches, the MMI position of the candidate word (3) now stored in W counting latch is ignored during the comparison operations of each directory search state 6 time interval. Thus, at the beginning of the fourteenth directory search, the candidate word is effectively DEC$\phi\phi$A.

In each state 6 time interval of the fourteenth and succeeding directory searches, the sequence of characters of candidate word from array 110 is compared to the corresponding characters of a selected directory word from shift register 640 in FIG. 6 in left to right order. At the beginning of the state 6 time interval, JP counter 780 is in its 0 state so that multiplexer 705 connects the output of shift register 205-0 to one input of comparators 709, 713 and 730. In the event the character from shift register 205-0 matches the character at the output of shift register 640, a high NEL signal and a low $\overline{\text{NEL}}$ signal is produced. Alternatively, if the character from shift register 205-0 is $\phi$, a high ZN output is obtained from comparator 709 since any mismatch is ignored. Responsive to either the low $\overline{\text{ZN}}$ or $\overline{\text{NEL}}$ outputs from comparator 709 and 713, JP counter 780 is incremented to its first state by enabled gates 740, 741 and 748. Shift register 640 is shifted right one position so that the first position character of the selected directory word is compared to the output of shift register 205-1 from multiplexer 705.

A low $\overline{\text{ZN}}$ output from comparator 709 or a low $\overline{\text{NEL}}$ output from comparator 713 obtained during the first character comparison causes JP counter 780 to be incremented to its second state. Shift register 640 is also shifted one position to the right so that the second character of the selected directory word can be compared to the output of shift register 205-2 from multiplexer 705. When the output of JP counter 780 is in its third state, comparator 796 which compares the JP=3 signal from counter 780 to the W=3 signal from W counting latch 960 enables gate 797. Gate 797, in turn, disables multiplexer 705. In its disabled condition, multiplexer 705 provides a zero character signal to comparator 709 regardless of the output of shift register 205-3. In this manner, a $\phi$ character is effectively substituted for the output of shift register 205-3 when the output of W counting latch 960 is W=3. In general, the output of the shift register of array 110 corresponding to the state of W counting latch 960 is replaced by a $\phi$ character by the disabling of multiplexer 705.

At the end of the fourteenth directory search in which no matching directory words are detected, the closest mismatched word in DECNA, the mismatched position in counting latch 940 is MI=3, and the modified candidate word is DEZ$\phi\phi$A. In the fifteenth, sixteenth and seventeenth directory search modes, each candidate word has an ignore match character in the third position as determined by the state of W counting latch 960 and the mismatched position MI of the closest mismatched word is used to modify the candidate word for the next directory search as previously described. Thus, at the end of the seventeenth candidate word change mode, the modified candidate word is DEC$\phi\phi$A.

During the eighteenth directory search mode, the candidate word BEC$\phi\phi$A is compared to the sequence of directory words selected on the basis of the zero, first and second position characters BEC from array 110. The sequence of directory words includes the word BECKGA. The zero, first and second characters of this directory word match the zero, first and second characters of the candidate word. The third character K of the directory word, however, does not match the output of shift register 205-3. Since JP counter 780 is in its third state and W counting latch 960 is also in its third state, gate 797 is enabled by the high ST6 and comparator 796 output signals and multiplexer 705 is disabled. The high ZN output from comparator 709 caused by disabled multiplexer 705 effectively ignores the mismatch between the output of shift register 640 and the output of shift register 205-3. JP counter 780 is incremented to its fourth state while shift register 640 is shifted right one position. The $\phi$ character output from register 205-4 while JP counter 780 is in its fourth state causes comparator 709 to produce a high ZN output and a low $\overline{\text{ZN}}$ output. Consequently, the mismatch between the G character from register 640 and the $\phi$ character from register 205-4 is ignored.

When JP counter 780 is in its fifth state, the last character (A) from the candidate word in shift register 205-5 is compared to the fifth position character (A) in shift register 640. The NLS=5 signal from directory 620, which indicates the last character of the directory word, matches the JP=5 output of JP counter 780. Consequently, comparator 732 in FIG. 7 produces a high JPENLS signal. The match between the A character of the candidate word and the A character from the directory word in shift register 640 provides a low $\overline{\text{NEL}}$ signal from comparator 713. The low $\overline{\text{NEL}}$ signal enables gate 803 in matched name logic 160 shown in FIG. 8. Gates 810 and 812 are enabled by the output of gate 803, the high JPENLS signal and the CL1 clock pulse at the end of the state 6 time interval. Consequently, match counter 821 is incremented to its first state.

The address of the directory word BECKGA from directory pointer 565 is then inserted into match name store 825 responsive to the high pulse from inverter 819. The directory search mode is continued by the initiation of a new state 5 time interval in which the next directory word of the sequence is accessed as previously described. Upon the termination of the eighteenth directory search mode in which a matching directory word was detected, gate 1060 in the sequence control logic of FIG. 10A is enabled by the high LKGNU signal from comparator 660 and the high $\overline{\text{ZM}}$ signal from code detector 828 in FIG. 8. A high D12 signal is produced, and the directory retrieval mode is entered by the initiation of the state 12 time interval.

In the state 12 time interval, matched name store 825 is addressed by the output of match counter 821. The address of the directory word BECKGA is supplied as the DR1 signal from matched name store 825 to directory pointer counter 565 via multiplexer 580. Responsive to the output of directory pointer 565 and directory address counter 615, the information associated with the matching directory word is obtained from directory 620 on line 610 and this information is applied to speech synthesizer 680. Synthesizer 680 is then operative, as is well known in the art, to produce a spoken message including the information associated with the directory word BECKGA. In a directory assistance arrangement, the associated information includes a telephone number. The spoken message from synthesizer 680 is supplied to the inquirer via message interface 101. The circuit of FIG. 1 then remains in the state 12 time interval until the initiation of a new request.

In the event that no matching directory words are detected in the eighteenth directory search, the candidate word is modified while retaining the ignore match character in the third position as designated by W counting latch 960. Assume that, at the termination of a subsequent directory search, MI counting latch 940 is in its second state so that MI=2 and W counting latch 960 is also in its second state (W=2). Since any change in the mismatched position character is ignored in the next directory search, the mismatched position is decremented and the character in the next left adjacent position is altered during the candidate word change mode.

In the initial state 13 time interval of the candidate word change mode in which MI is equal to W, the output of W counting latch 960 is supplied to one input of comparator 970 via multiplexer 967. The output of MI counting latch 940 is applied to the other input of comparator 970. Since both latch 940 and 960 are in their third states, comparator 970 produces a high MIEW signal and gate 927 is enabled. During the CL1 clock pulse of this state 13 time interval, MI counting latch 940 is decremented by the CL1 pulse applied via gates 931 and 925. The high $\overline{\text{MIEN}}$ and MIEW signals obtained during this state 13 time interval enable gates 1068 and 1071 in the sequence control logic shown in FIG. 10A whereby a high D13 signal is produced. Control flip-flop 1021A in FIG. 10B remains set and the state 13 time interval is reinitiated.

In the reinitiated state 13 time interval a high $\overline{\text{MIEW}}$ signal is obtained from comparator 970 and the decremented MI=1 signal is supplied to the control inputs of decoder 319 via multiplexer 331. A shift pulse is generated in gate 317 as previously described and this shift pulse causes shift registers 205-1 and 206-1 to shift right one character position. In this manner, the substitution of available characters in a character position that is being ignored is avoided.

In the event that there are no more available characters in the zero position of the candidate array for substitution in the candidate word of the preceding search during a candidate word change mode, MI counting latch 940 is decremented to its minus 1 state during a state 15 time interval via gates 915, 928, 931 and 925. Since all available characters in array 110 have been used to form candidate words with a specified ignore character position, the ignore character position is shifted one place to the left preparatory to further directory searches.

In the state 13 time interval following the state 15 time interval in which MI counting latch 940 is decremented to its minus 1 state, multiplexer 331 in FIG. 3 is operative to connect the W signal output of W counting latch 960 to the control inputs of encoder 307 and decoder 319 responsive to the MIEN and $\overline{\text{WEN}}$ signals supplied to gate 325. Assume for purposes of illustration W=2. The post number output of shift register 206-2 is supplied to gate 309 via encoder 307. As long as the post number output from shift register 206-2 is nonzero, gate 315 passes CL2 clock pulses through decoder 319 to line SJ3. In this manner, shift registers 205-2 and 206-2 are shifted to the right until the 0 post number appears at the output of shift register 206-2. At this time, the most probable character of the second position of the candidate word, i.e., C, appears at the output of shift register 205-3. At the end of the CL1 clock pulse of this state 13 time interval, gates 941, 946 and 950 are enabled by the high MIEN, $\overline{\text{WEN}}$ and CL1 signals so that W counting latch 960 is decremented to its first state.

During the state 13 time interval in which W counting latch 960 is decremented to its first state, a high $\overline{\text{WEN}}$ output is obtained from code detector 964. A high MIEN signal is also obtained from code detector 962 since all available characters in the zero position of the candidate word have been exhausted. The high MIEN and $\overline{\text{WEN}}$ signals enable gate 1087 in sequence control logic 180 shown in FIG. 10A whereby a high D16 signal is produced and the state 16 time interval is initiated by the setting of control flip-flop 1027A at the end of this state 13 time interval CL1 clock pulse. In the state 16 time interval, the $\overline{\text{WEN}}$ output of detector 964 remains high. Consequently, gate 1007 in FIG. 10A is enabled and a new directory search mode is entered responsive to the generation of a high D2 output from gate 1009.

The directory search and candidate word change mode sequences continue in the absence of detected matching directory words as previously described until the ignore mismatch character position W is shifted to the zero position of the candidate word. When MI counting latch 940 is decremented to its −1 state and W counting latch 960 is decremented to its −1 state at the end of a state 13 time interval, a high D16 pulse is provided by gate 1087 and inverter 1089 in FIG. 10. W counting latch 960 is decremented by the negative transition of the state 13 CL1 clock pulse. During the succeeding state 16 time interval, code detector 964 provides a high WEN output and a low $\overline{\text{WEN}}$ output. A new directory search is not initiated at this time since all possible combinations of mismatched and ignore character positions have been used.

The WEN output of code detector 964 enables gate 1093 in the state 16 time interval and a high D17 signal appears at the output of gate 1097 (FIG. 10A) in the state 16 time interval. This high D17 pulse sets control flip-flop 1030A in FIG. 10B upon the termination of the CL1 clock pulse of the state 16 time interval. The ST17 signal from control flip-flop 1030A is supplied to speech synthesizer 680 in FIG. 6. Responsive to the ST17 signal, speech synthesizer 680 generates a spoken message indicating that there is no directory word corresponding to the spoken input character string and the spoken message is transmitted to the inquirer via message interface 101. The operation of the automatic directory assistance retrieval system is then halted in state 17 until another inquiry message is received by message interface 101.

In the state 2 time interval of each directory mode as previously described, the zero position character of the candidate word from the output of shift register 205-0 is inspected. If this zero position character is a $\phi$, the aforementioned directory range selection and directory access arrangements result in a selected sequence of directory words which include all words in directory store 620. In order to limit the range of the directory word sequence, an alternative arrangement, based on the first, second and third characters of the candidate word, is used.

Assume for purposes of illustration, that a candidate word whose first four characters are $\phi$BCJ is to be used in a directory search mode. Since there is a $\phi$ character in the zero position, a high ZN output is obtained from comparator 709 during the state 2 time interval in which the zero position character is compared to the output of code generator 707. Responsive to the high ZN output of comparator 709, gate 1047 in FIG. 10A is enabled during the state 2 time interval and a high D8 signal is produced by inverter 1048. At the end of the CL1 clock pulse of the state 2 time interval, the high D8 signal sets control flip-flop 1013A in FIG. 10B to its 1 state and control flip-flop 1002A is reset to its zero state. The state 8 time interval is thereby initiated.

At the beginning of the state 8 time interval, JP counter 780 is in its first state and range counter and decoder 436 is in its zero state. A high CLa' clock pulse is therefore applied to latches 411 and 422 in FIG. 4 and the output of shift register 205-1 is supplied to the inputs of selectors 405 and 415 via multiplexer 705. The B character now at the output of register 205-1 is then inserted into latches 411 and 422. Upon the occurrence of the first CL2 clock pulse in the state 8 time interval, gates 430 and 432 in FIG. 4 are enabled so that range counter 436 is incremented to its second state and CLb' signal is applied to the control inputs of latches 409 and 420. JP counter 780 is also incremented by the RC signal output of gate 432.

Multiplexer 705 is responsive to the JP=2 signal from counter 780 to connect the output of shift register 205-2 to the inputs of latches 409 and 420 in FIG. 4. The C character now at the output of shift register 205-2 is thereby inserted into latches 409 and 420. Responsive to the next CL2 applied to gate 432, both range counter 436 and JP counter 780 are incremented to their third states and the J character from the output of shift register 205-3 is inserted into latches 407 and 418 responsive to the CLc' pulse applied to the latches. The outputs of latches 418, 420, 422 form the NL signal which is used as the lower bound directory range signal. The outputs of latches 407, 409 and 411 form the N2U signal which is the upper bound of the selected directory range.

In the event that one of the character signals applied to selector 405 during the state 8 time interval is a $\phi$ character, comparator 709 provides a high ZN signal and a "26", or Z character, is inserted into the selected latch of latches 407, 409 and 411. Similarly, a $\phi$ character causes selector 415 to connect one code generator 413 to the inputs of latches 418, 420 and 422 so that "1", or an A character, is substituted for the $\phi$ character in these latches. After the second CL2 clock pulse, gate 432 is inhibited and range counter 436 and JP counter 780 remain in their second states.

During the CL1 clock pulse at the end of the state 8 time interval, key counter 507 is cleared to its zero state responsive to the low $\overline{ST8}$ signal applied to gate 508 and the high CL1 clock pulse applied to gate 510. The lower range limit signal NL is supplied to comparator 514. At the termination of the state 8 CL1 clock pulse, control flip-flop 1014A in FIG. 10B is set to initiate the state 9 time interval.

During the state 9 time interval, the first directory address is selected on the basis of the lower limit range signal NL from latches 418, 420 and 422. This is done by comparing the output of K2 read-only memory 518 to the NL signal in comparator 514. K2 read-only memory 518 contains a list of selected directory words. Each location in memory 518 consists of the first, second and third position characters of the directory word. The first location in K2 ROM 518 corresponds to the first directory address in secondary directory ROM 545. The next location in K2 ROM 518 corresponds to another directory word in secondary directory ROM 545 which is spaced a predetermined number of directory addresses from the first directory address in secondary directory ROM 545. Similarly, the other locations in K2 ROM 518 correspond to spaced directory entries in secondary directory ROM 545.

K2 ROM 518 is used to select the first directory word of the sequence based on the first, second and third position characters so that the first selected word is within a predetermined range of the lower bound secondary directory word defined by signal NL. D2 address ROM 522 contains a list of directory word addresses which correspond to the K2 ROM 518 locations. Thus, once a K2 ROM word is selected, the output of D2 ROM 522 may be utilized as the first word address in the indirect directory word search. The first word address is selected to be below but within a predetermined range of the lower limit signal NL.

Initially, the contents of the first location of K2 ROM 518 are compared to the lower limit NL signal in comparator 514. If the NL signal is greater than the K2 signal, gate 505 is enabled during the state 9 CL 1 pulse interval and key counter 507 is incremented. The second location of K2 ROM 518 is addressed as well as the corresponding directory word address in D2 ROM 522. Key counter 507 is incremented by the CL1 clock pulses from gate 505 until the K2 signal from ROM 518 is greater in value than the lower bound signal NL. The $\overline{NLGK}$ signal is then produced by comparator 514. Gate 505 is inhibited and the output of D2 ROM 522 is the first address to be used, based on the first, second and third position characters of the candidate word. The D2 address code is loaded into counter 543 in the state 9 time interval responsive to signal ST9. Counter 543 is used to address secondary directory ROM 545 with the address obtained from D2 address ROM 522.

ROM 545 is a secondary directory which contains directory addresses of store 620 ordered in accordance with the first, second and third character positions rather than the zero, first and second character positions. ROM 545 contains a stored conversion table which is addressed by counter 543 on the basis of the first, second and third character positions of selected directory words. Since each directory word addressed on the basis of the first, second and third character positions may be prefixed and suffixed by one or more other position characters, there are, in general, a plurality of directory addresses to be searched for each address input to ROM 545 based on the first, second and third character positions. Further, the output directory addresses LRC from ROM 545 are nonsequential. ROM 545 is arranged to provide the series of nonsequential address signals LRC which may be applied to the address input of directory 620 responsive to the sequential addresses from counter 543 based upon the first, second and third character positions of the candidate word.

When the $\overline{\text{NLGK}}$ signal is obtained from comparator 514 during state 9, signifying that the lower bound D2R address of the sequence is available from ROM 522, gate 1050 in sequence control logic 180 shown in FIG. 10A is enabled and a high D10 signal appears at the output of gate 1053. Responsive to the high D10 signal, control flip-flop 1016A in FIG. 10B is set. Upon termination of the state 9 CL1 clock pulse, control flip-flop 1014A in FIG. 10B is reset so that the state 10 time interval is initiated. During the state 10 time interval, an L2K signal is obtained from ROM 545. This L2K signal corresponds to the first, second and third position characters of the address signal in counter 543.

The L2K signal is applied to one input of comparator 530. The N2U signal from directory range selector 120 in FIG. 4 is applied to the other input of comparator 530. As aforementioned, the N2U signal corresponds to the upper limit of the directory range based on the first, second and third position characters. As long as the LRC address from ROM 545 is within the selected directory range, the L2K signal is not greater than the N2U signal and comparator 530 provides a high $\overline{\text{L2KGN2U}}$ signal as well as the low L2KGN2U signal.

The high $\overline{\text{L2KGN2U}}$ signal from comparator 530 is applied to gate 570 in FIG. 5 during the state 10 time interval. Gate 570 is enabled whereby multiplexer 580 is rendered operative to connect the LRC address signal from ROM 545 to the input of directory pointer counter 565. The output of gate 570 also enables gate 556 and a high input signal is supplied to the load input of directory pointer counter 565. Gates 558 and 563 are enabled during the CL1 clock pulse of the state 10 time interval whereby the clock input of directory pointer counter 565 is enabled. Responsive to the load and clock inputs, directory pointer 565 stores the LRC address from ROM 545 and the LRC address is supplied as the DR signal to address input 621 of directory 620.

The high $\overline{\text{L2KGN2U}}$ signal also enables gate 604 during the state 10 time interval whereby directory address counter 615 is cleared to its zero state by the CL1 clock pulse of the state 10 time interval via gates 611 and 614. Thus, at the end of the state 10 time interval, the first character of the directory word in directory 620 corresponding to the address in counter 543 is available on line 610 from directory 620. The state 10 time interval is terminated and the state 11 time interval is started responsive to the high $\overline{\text{L2KGNU}}$ SIGNAL applied to gate 1054 in the control sequence logic of FIG. 10A.

During the state 11 time interval, directory address counter 615 is successively incremented by the CL2 clock pulses applied to gate 607; and the shift input of shift register 640 is successively enabled by the CL2 clock pulses of state 11 and the CL1 clock pulse of state 11 applied to gate 631 via inverters 624 and 628 and gate 626. Multiplexer 629 is operative to connect line 610 from directory 620 to the input of shift register 640 responsive to the ST11 signal on gate 625. In this manner, the successive characters of the selected directory words are inserted into shift register 640 in a left to right sequence. Flag flip-flop 1035A in FIG. 10B is set by the low $\overline{\text{ST11}}$ signal from control flip-flop 1018A. The high FL signal from flip-flop 1035A is used in the state 6 and state 7 time intervals to return to the indirect addressing arrangement during the directory search mode.

At the end of the state 11 time interval, the zero position character of the addressed directory word appears at the output of shift register 640. During the state 11 time interval, gate 1036 in the sequence control logic of FIG. 10A is enabled by the low $\overline{\text{ST11}}$ signal from flip-flop 1018A on line 1034. At the termination of the state 11 CL1 clock pulse, control flip-flop 1018A in FIG. 10B is reset and control flip-flop 1010A is set whereby the state 6 time interval is reinitiated. As previously described, the candidate word from the output of candidate array 110 is compared to the selected directory word in shift register 640 in the state 6 time interval.

In the event the selected directory work matches the candidate word from array 110, match counter 821 is incremented and the address of the matching directory word is inserted into the matched name store 825 of FIG. 8. Gate 1092 in FIG. 10A is enabled upon the termination of the last character of the matched word signaled by a low output from gate 1017. Responsive to the high output from gate 1092 in the state 6 time interval, a high D10 signal is produced. Alternatively, if there is a mismatch between a character from array 110 and a corresponding character from shift register 640, gate 1043 in FIG. 10A is enabled by the high ZN, $\overline{\text{NEL}}$, $\overline{\text{NE27}}$, or $\overline{\text{LE27}}$ signals and a high D7 pulse produced. This high D7 pulse initiates a state 7 time interval in which MMI counting latch 910 stores the rightmost first occurring mismatched position of this and the preceding directory searches as previously described. The high ST7 signal from control flip-flop 1011A and the high FL signal from flag flip-flop 1035A enable gate 1069 which in turn, causes a high D10 signal to be generated.

Responsive to a matching directory word in the state 6 time interval, indicated by a high signal from gate 529 in FIG. 5, the CL1 clock pulse terminating the state 6 time interval is passed through gates 539 and 541 to increment counter 543 to its next state. Counter 543 then addresses the next word in ROM 545 and a new LRC address signal is obtained therefrom. In the event of a mismatch, a high ST7 signal is produced during the state 7 time interval. This high ST7 signal and signal FL enables gates 534 and 536 whereby the CL1 clock pulse of the state 7 time interval increments counter 543 via gates 538 and 541. In either event, a high D10 signal is produced responsive to the enabling of gate 1092 (FIG. 10A) in the state 6 time interval or the enabling of gate 1069 (FIG. 10A) in the state 7 time interval.

The high D10 signal from gate 1052 sets control flip-flop 1016A in FIG. 10B and reinitiates the state 10 time interval during which the newly accessed LRC address from ROM 545 is transferred into directory pointer counter 565 via multiplexer 580. The L2K signal output of ROM 545 is compared to the N2U upper limit signal from directory range selector 120 of FIG. 4 in comparator 530; and, responsive to an $\overline{\text{L2KGN2U}}$ signal, another state 11 time interval is started by gate 1054 in FIG. 10A.

The directory search mode utilizing the indirect addressing via secondary directory ROM 545 continues to compare the selected directory words of the range determined by directory range selector 120 until the state 10 time interval in which the L2K signal from ROM 545 exceeds the N2U upper bound signal from range selector 120. When this occurs, comparator 530 produces a high L2KGN2U signal which terminates the indirectly addressed directory search mode. When no matching directory words are detected in this directory search mode, the high ZM signal from zero detector 828 in FIG. 8 and the high L2KGN2U signal from comparator 530 enable gate 1070 in FIG. 10A to produce a high D13 signal which initiates the state 13 time interval of the candidate word change mode. Alternatively, if there are matching directory words detected during the directory search mode, the high $\overline{ZM}$ signal from zero detector 828 and the high L2KGN2U signal from comparator 530 in the state time interval enable gate 1058 in FIG. 10 whereby a directory retrieval mode is entered responsive to the high D12 signal from gate 1063 in FIG. 10A. Advantageously, the indirect addressing arrangement using secondary directory ROM 545 permits the circuit of FIG. 1 to detect directory words which match the input character string when the leftmost, or most significant character of the string is unrecognized.

While the invention has been particularly shown and described with reference to a preferred embodiment thereof, it will be understood by those skilled in the art that various modifications may be made thereto without departing from the spirit and scope of the invention.

What is claimed is:

1. A circuit for recognizing a sequence of spelled character signals comprising a directory store for storing a plurality of reference words each having a set of prescribed characters; means for receiving a sequence of spelled character signals; means connected to said receiving means responsive to each received spelled character signal for generating a set of probable characters; means connected to said probable character set generating means for storing a set of probable characters for each spelled character signal in a predetermined position of a position ordered array; means responsive to the storing of the final character signal probable character set of the sequence for generating a candidate word comprising a probable character from each spelled character position of the array; means for storing the generated candidate word; means responsive to the storing of said generated candidate word for generating a first signal; directory store search means responsive to said first signal for determining directory store reference words which correspond to the sequence of spelled character signals comprising means responsive to the stored candidate word for selecting a sequence of directory store reference words; means jointly responsive to said selected sequence of directory store reference words and said stored candidate word for comparing the characters of each word of said selected sequence of directory store reference words with the corresponding characters of said stored candidate word in left to right order to detect directory store reference words that match said stored candidate word; means responsive to the nonmatching directory store reference words of said selected sequence for detecting the rightmost first occurring mismatched position of all nonmatching directory store reference words of the selected sequence; means jointly responsive to the absence of matching directory store reference words in the selected sequence and said detected mismatched position of said selected sequence for generating a modified candidate word and for storing said modified candidate word in said candidate word storing means; means responsive to the storing of said modified candidate word for generating a first signal to initiate a succeeding directory store search; and means responsive to the detection of at least one directory store reference word that matches a stored candidate word in a directory store reference word sequence search for identifying the sequence of spelled character signals as said matching directory words.

2. A circuit for recognizing a sequence of spelled character signals according to claim 1 wherein said modified candidate word generating means comprises means responsive to said rightmost first occurring detected mismatched position for replacing the character in the rightmost first occurring detected mismatched position of the candidate word with another probable character from the corresponding position of the array.

3. A circuit for recognizing a sequence of spelled character signals according to claim 2 wherein said modified candidate word generating means further comprises means responsive to the absence of another probable character in the array position corresponding to the detected mismatched position for generating a second signal; means responsive to said second signal for shifting the detected mismatched position left to the next array position in which there is another probable character for substitution; and means for substituting said other probable character in the shifted detected mismatched position of the array for the character in the shifted detected mismatched position of the candidate word.

4. A circuit for recognizing a sequence of spelled character signals according to claim 3 wherein said directory store search means further comprises means for detecting the rightmost first occurring mismatched position of the current and all preceding directory store selected reference word sequence searches; means for storing the best candidate word corresponding to said detected rightmost first occurring mismatched position of the current and all preceding directory store selected reference word sequence searches; and wherein said modified candidate word generating means further comprises means responsive to the absence of another probable character in the leftmost position of the array for generating a third signal; and means responsive to said third signal for forming a modified candidate word from said best candidate word by replacing the character of said best candidate word in said rightmost first occurring mismatched position of all preceding directory store selected reference word sequence searches with an ignore mismatch character.

5. A circuit for recognizing a sequence of spelled character signals according to claim 4 wherein said modified candidate word generating means further comprises means jointly responsive to the absence of another probable character for substitution in the leftmost position of the array and the presence of an ignore mismatch character in the stored candidate word for generating a fourth signal; and means responsive to said fourth signal for forming a modified candidate word by shifting said ignore mismatch character to the adjacent left position of the stored candidate word.

6. A circuit for recognizing a sequence of spelled character signals according to claim 5 wherein said modified candidate word generating means further comprises means jointly responsive to the ignore mismatch character being in the leftmost position of the stored candidate word and the absence of a probable character for substitution in the next to leftmost position of the array for terminating said directory store selected reference word sequence searches.

7. A circuit for recognizing a sequence of character signals comprising a directory store for storing a plurality of reference words, each reference word including a set of prescribed character codes; means for receiving a sequence of character signals; means responsive to each received character signal for generating a set of probable character codes; an array of character set registers, each register being responsive to said probable character code set generating means for storing a set of probable character codes in most to least probable order; said probable character code sets being stored in left to right order in said character set register array; said character code set corresponding to the first character signal of the sequence being in the leftmost position register; means responsive to the storing of the character set corresponding to the final character signal of the sequence for generating a candidate word comprising the most probable character of each position register of the array; means for storing said candidate word; means responsive to the storing of said candidate word for generating a first signal; directory store search means responsive to said first signal for determining directory store reference words which correspond to said sequence of character signals comprising means responsive to the stored candidate word for selecting a sequence of directory store reference words; means for comparing the character codes of each directory store reference word of the selected sequence with the corresponding character codes of the stored candidate word in left to right order to detect matching directory store reference words; means responsive to the nonmatching directory store reference words of said selected sequence for detecting the rightmost first occurring mismatched position of all nonmatching directory store reference words; means jointly responsive to the absence of matching directory store reference words in the selected sequence and the detected mismatched position of the selected sequence for generating a modified candidate word and for storing said modified candidate word in said candidate word storing means, means responsive to the storing of said modified candidate word for generating a first signal to initiate a succeeding directory store search; and means responsive to the detection of at least one matching directory store reference word in a directory store search for identifying the sequence of character signals as said detected matching directory store reference words.

8. A circuit for recognizing a sequence of character signals according to claim 7 wherein each character signal is a spoken character signal.

9. A circuit for recognizing a sequence of character signals according to claim 7 wherein said modified candidate word generating means comprises means responsive to said detected rightmost first occurring mismatched position for forming a modified candidate word by substituting the next most probable character code from the detected rightmost first occurring mismatched position register of the array in the detected mismatched position of the candidate word.

10. A circuit for recognizing a sequence of character signals according to claim 9 wherein said modified candidate word forming means comprises means responsive to the absence of a next most probable character code in said detected mismatched position register of the array for generating a second signal, means responsive to said second signal for replacing the most probable character code from the detected mismatched position register of the array in the corresponding position of the candidate word, means responsive to said second signal for shifting said detected mismatched position left to the next position register of the array having a next most probable character code, and means responsive to said second signal for substituting said next position register next most probable character code in the corresponding position of the candidate word.

11. A circuit for recognizing a sequence of character signals according to claim 10 wherein said directory store search means further comprises means for detecting the rightmost first occurring mismatched position of the current and all preceding directory store selected reference word sequence searches; means for storing the candidate word of the directory store reference word sequence search in which said rightmost first occurring mismatched position of the current and all preceding directory search operations is detected as the best candidate word; and said modified candidate word forming means further comprises means responsive to the absence of a next most probable character code in the leftmost position register of the array for generating a third signal; and means responsive to said third signal for forming a modified candidate word from said best candidate word by substituting an ignore mismatch character in said rightmost first occurring mismatched position of all preceding directory store selected reference word sequence searches in the corresponding position of said best candidate word.

12. A circuit for recognizing a sequence of character signals according to claim 11 wherein said modified candidate word forming means further comprises means jointly responsive to the absence of a next most probable character code in the leftmost position register of the array and an ignore mismatch character code in the stored candidate word of the preceding directory store selected reference word sequence search for generating a fourth signal; and means responsive to said fourth signal for forming a modified candidate word by replacing the ignore mismatch character code in the candidate word of the preceding directory search with the most probable character code of that position register of the array and placing the ignore mismatch character code in the adjacent left position of the stored candidate word of the preceding directory store selected reference word sequence search.

13. A circuit for recognizing a sequence of character signals according to claim 12 wherein said modified candidate word forming means further comprises means jointly responsive to the ignore mismatch character code being in said leftmost position of the stored candidate word of the preceding directory store selected reference word sequence search and the absence of a next most probable character code in the next to leftmost position register of the array for inhibiting succeeding directory store selected reference word sequence searches.

14. A circuit for retrieving information from a directory in response to a sequence of spoken characters comprising a directory store for storing reference words, each reference word comprising a set of prescribed characters and each reference word addressing associated information in said directory store; means for receiving a sequence of spoken character signals; means responsive to each received spoken character signal for generating a set of probable characters; means connected to said probable character set generating means for storing each set of probable characters in most to least probable order for said spoken character signal in a predetermined position of a left to right position ordered array; means responsive to the storing of the final probable character set of the sequence for generating a candidate word comprising the most probable character of each position of the probable character set array; means for storing said candidate word; means responsive to the storing of said candidate word for generating a first signal; directory store search means responsive to said first signal for searching said directory store to determine directory store reference words corresponding to the sequence of spoken characters comprising means responsive to the stored candidate word for selecting a sequence of directory store reference words; means for comparing each directory store reference word of the selected sequence with the stored candidate word in a left to right character sequence to detect directory store reference words that match said stored candidate word; means responsive to the nonmatching directory store reference words of the selected sequence for detecting the rightmost first occurring mismatched position of all nonmatching directory store reference words of the selected sequence; means jointly responsive to the absence of a detected matching directory store reference word in said selected sequence and the detected rightmost first occurring mismatched position of said selected sequence for generating a modified candidate word and for storing said modified candidate word in said candidate word storing means; means responsive to the storing of said modified candidate word for generating a first signal to initiate a next directory store reference word search; means responsive to the detection of at least one matching directory store reference word in a selected sequence for retrieving the associated information of each detected matching directory store reference word; and means for forming a spoken message corresponding to said associated information.

15. A circuit for retrieving information from a directory in response to a sequence of spoken characters in accordance with claim 14 wherein said modified candidate word generating means comprises means responsive to said detected mismatched position for substituting the next most probable character in the detected mismatched position of the array in the detected mismatched position of the candidate word.

16. A circuit for retrieving information from a directory in response to a sequence of spoken characters in accordance with claim 15 wherein said modified candidate word generating means further comprises means responsive to the absence of a next most probable character in the detected mismatched position of the array for generating a second signal; means responsive to said second signal for replacing the character in said detected mismatched position of the candidate word with the most probable character of said detected mismatched position of the array; means for shifting the detected mismatched position left to the next left position of the array in which there is a next most probable character for substitution; and means for substituting said next most probable character in said next left position of the array for the character in said next left position of the candidate word.

17. A circuit for retrieving information from a directory in response to a sequence of spoken characters in accordance with claim 16 wherein said directory store search means further comprises means for detecting the rightmost first occurring mismatched position of the current and all preceding directory store selected reference word sequence; means for storing the best candidate word corresponding to said detected rightmost first occurring mismatched position of the current and all preceding directory store selected reference word sequence searches; and wherein said modified candidate word generating means further comprises means responsive to the absence of a next most probable character in the leftmost position of the array for substitution for generating a third signal; means responsive to said third signal for forming a modified candidate word from said best candidate word by replacing the character in said detected rightmost first occurring mismatched position of all preceding directory searches of the best candidate word with an ignore mismatch character.

18. A circuit for retrieving information from a directory in response to a sequence of spoken characters in accordance with claim 17 wherein said modified candidate word generating means further comprises means responsive to the absence of a next most probable character in the leftmost position of the array and the presence of an ignore mismatch character in the stored candidate word of the immediately preceding directory store search for generating a fourth signal; and means responsive to said fourth signal for forming a modified candidate word by replacing the ignore mismatch character in the stored candidate word of the immediately preceding directory store search with the most probable character of that position in the array and placing the ignore mismatch character in the adjacent left position of the stored candidate word of the preceding directory store search.

19. A circuit for retrieving information from a directory in response to a sequence of spoken characters in accordance with claim 18 wherein said modified candidate word generating means further comprises means jointly responsive to the ignore mismatch character being in the leftmost position of the stored candidate word and the absence of a next most probable character in the next to leftmost position of the array for forming a spoken message corresponding to the absence of matching directory words.

20. In a circuit for retrieving information from a directory in response to a sequence of spoken character signals including a directory store for storing a plurality of reference words addressing associated information and said associated information; means for receiving a sequence of spoken character signals; a character position ordered array; and a trial word store; a method for recognizing said sequence of spoken character signals comprising the steps of generating a set of probable characters for each spoken character signal responsive to the sequence of received spoken character signals; storing a set of probable character signals in most to least probable order for each received spoken character signal in a predetermined position of said position ordered array; responsive to the storing of the final probable character set for said sequence, generating a trial word comprising the most probable character from each array position; storing said generated trial word in said trial word store; responsive to the storing of said generated trial word, generating a first signal; responsive to said first signal, searching said directory store to determine reference words which correspond to the sequence of received spoken character signals including selecting a sequence of directory store reference words responsive to said stored trial word; comparing the characters of each directory store selected sequence reference word with the corresponding probable characters of said stored trial word in left to right order to detect directory store selected sequence reference words which match said stored trial word; detecting the rightmost first occurring mismatched position in all the non-matching reference words of the directory store selected sequence; generating a modified trial word from the array jointly responsive to the absence of a matching reference word in said directory store selected sequence and said detected rightmost first occurring mismatched position; storing said modified trial word in said trial word store; generating a first signal to initiate a next directory store searching step responsive to the storing of said modified trial word; retrieving the associated information of each detected matching directory store reference word responsive to the detection of at least one matching reference word in a directory store selected sequence searching step; and forming a spoken message corresponding to said matching directory store reference words and said associated information.

21. A method for retrieving information from a directory storing a plurality of words addressing associated information and said associated information responsive to a sequence of spoken character signals according to claim 20 wherein the generation of the modified trial word comprises substituting the next most probable character from the detected mismatched position of the array in the detected mismatched position of the stored trial word.

22. A method for recognizing a sequence of spoken character signals according to claim 21 wherein the generation of the modified trial word further comprises forming a second signal responsive to the absence of a next most probable character in said detected mismatched position of the array; replacing the character in said detected mismatched position of the stored trial word with the most probable character of the detected mismatched position of the array responsive to said second signal; shifting the detecting mismatched position left to the next left position in which there is a next most probable character in the array for substitution responsive to said second signal; and substituting said next most probable character in said next left position of the array in the next left position of the stored trial word responsive to said second signal.

23. A method for recognizing a sequence of spoken character signals according to claim 22 wherein said directory store searching step further comprises detecting the rightmost first occurring mismatched position of the current and all preceding directory searches and storing the best trial word corresponding to said detected rightmost first occurring mismatched position of the current and all preceding directory searches; and wherein the generation of the modified trial word further comprises forming a third signal responsive to the absence of a next most probable character in the leftmost position of the array; forming a modified trial word from said best trial word by replacing the character in said detected rightmost first occurring mismatched position of all preceding directory store selected sequence reference word searches in the best trial word with an ignore mismatch character responsive to said third signal.

24. A method for recognizing a sequence of spoken character signals according to claim 23 wherein the generation of the modified trial word further comprises forming a fourth signal responsive to the absence of a next most probable character for substitution in the leftmost position of the array and the presence of an ignore mismatch character in the stored trial word; and forming a modified trial word by replacing the ignore mismatch character in the stored trial word with the most probable character of that position in the array and placing the ignore mismatch character in the adjacent left position of the stored trial word responsive to said fourth signal.

25. A method for recognizing a sequence of spoken character signals according to claim 24 wherein the generation of the modified trial word further comprises forming a spoken message corresponding to the absence of matching directory store selected sequence reference words responsive to the ignore mismatch character being in the leftmost position of the stored trial word and the absence of a next most probable character in the next to leftmost position of the array.

26. A directory assistance system comprising a directory store for storing a plurality of subscriber names addressing associated subscriber information; means for recognizing a sequence of spoken character signals spelling a subscriber name comprising means for receiving a sequence of spoken character signals, means responsive to said received spoken character signals for generating a set of probable characters for each spoken character signal; means connected to said probable character set generating means for storing each set of probable characters in most to least probable order in a predetermined position of a position ordered array; means responsive to the storing of the final probable character set of the sequence for generating a candidate name comprising the most probable character of each position of the array; means for storing said candidate name; means responsive to the storing of said candidate name for generating a first signal; directory store search means responsive to said first signal for determining subscriber names corresponding to the sequence of spoken character signals comprising means responsive to said stored candidate name for selecting a sequence of directory store subscriber names; means for comparing the characters of each directory store selected sequence subscriber name with the corresponding characters of the stored candidate name in left to right order to detect directory store selected sequence subscriber names that match said stored candidate name; means responsive to the nonmatching names of the selected sequence of directory store subscriber names for detecting the rightmost first occurring mismatched position of all nonmatching subscriber names of the selected sequence of directory store subscriber names; means jointly responsive to the absence of matching subscriber names in the selected sequence of directory store subscriber names and the detected mismatched position for generating a modified candidate name and for storing said modified candidate name in said candidate name storing means; means responsive to the storing of said modified candidate name for generating a first signal to initiate a next directory store search; means responsive to the detection of at least one matching subscriber name in a selected sequence of directory store subscriber names for retrieving the associated information for each matching subscriber name; and means for forming a spoken message corresponding to each matching subscriber name and the associated subscriber information.

27. A directory assistance system according to claim 26 wherein said modified candidate name generating means comprises means responsive to said detected mismatched position for substituting the next most probable character in the detected mismatched position of the array for the character in the detected mismatched position of the stored candidate name.

28. A directory assistance system according to claim 27 wherein said modified candidate name generating means further comprises means responsive to the absence of a next most probable character in the detected mismatched position of the array for substitution for generating a second signal; means responsive to said second signal for replacing the character in said detected mismatched position of the stored candidate name with the most probable character of the detected mismatched position of the array; means for shifting the detected mismatched position left to the next left position of the array in which there is a next most probable character for substitution; and means for substituting said next most probable character in said next left position of the array for the character in said next left position of the stored candidate name.

29. A directory assistance system according to claim 28 wherein said directory store search means further comprise means for detecting the rightmost first occurring mismatched position of the current and all preceding directory store searches; means for storing the best candidate name corresponding to the detected rightmost first occurring mismatched position of the current and all preceding directory store searches; and wherein said modified candidate name generating means further comprises means responsive to the absence of a next most probable character in the leftmost position of the array for generating a third signal; and means responsive to said third signal for forming a modified candidate name from the best candidate name by replacing the character in the detected rightmost first occurring mismatched position of all preceding directory searches in said best candidate name with an ignore mismatch character.

30. A directory assistance system according to claim 29 wherein said modified candidate name generating means further comprises means responsive to the absence of a next most probable character in the leftmost position of the array for substitution and the presence of an ignore mismatch character in the stored candidate name for generating a fourth signal; and means responsive to said fourth signal for modifying the stored candidate name by replacing the ignore mismatch character with the most probable character of that position of the array and placing the ignore mismatch character in the adjacent left position of the stored candidate name.

31. A directory assistance system according to claim 30 wherein said modified candidate name generating means further comprises means jointly responsive to the ignore mismatch character being in the leftmost position of the stored candidate name and the absence of a next most probable character in the next to leftmost position of the array for forming a spoken message corresponding to the absence of matching directory names in said directory.

* * * * *

UNITED STATES PATENT AND TRADEMARK OFFICE
CERTIFICATE OF CORRECTION

PATENT NO. : 4,164,025
DATED : August 7, 1979
INVENTOR(S) : John J. Dubnowski and Aaron E. Rosenberg It is certified that error appears in the above-identified patent and that said Letters Patent are hereby corrected as shown below:

Column 2, line 10, "trail" should read --trial--. Column 3, line 17, "the" should read --The--. Column 3, line 27, "is" should read --in--. Column 5, line 34, "interfere" should read --interface--. Column 6, line 58, "is" should read --in--. In Table 2, Column 8, --1-- should be inserted over "Directory Search". In Table 2, Column 8, line 8, "PECJ$\phi$A" should read --BECJ$\phi$A--. In Table 2, Column 8, line 9, "PEZJ$\phi$A" should read --BEZJ$\phi$A--. In Table 2, Column 8, line 18, "BFC$\phi\phi$A" should read --BEC$\phi\phi$A--. Column 9, line 10, "Becuase" should read --Because--. Column 10, line 53, "distant" should read --distance--. Column 12, line 46, "Positive" should read --Position--. Column 13, line 6, "inserter" should read --inverter--. Column 13, line 37, "modified" should read --modifier--. Column 13, line 64, "doing" should read --going--. Column 15, line 10, "is" should read --in--. Column 16, line 7, insert --Upon the-- before "occurrence". Column 21, line 65, after "pulse" insert a period. Column 28, line 15, "of" should read --to--. Column 28, line 57, "work" should read --word--. Column 28, line 59, "in" should read --is--. Column 30, line 67, "about" should read --and--. Column 33, line 33, "latch" should read --latches--. Column 38, line 11, "work" should read --word--.

Signed and Sealed this

Eighth Day of January 1980

[SEAL]

Attest:

SIDNEY A. DIAMOND

Attesting Officer  Commissioner of Patents and Trademarks